US012774160B1

(12) United States Patent
Gorman et al.

(10) Patent No.: US 12,774,160 B1
(45) Date of Patent: Oct. 27, 2026

(54) TWO-DIMENSIONAL CONVEYOR SYSTEM WITH CROSSING SQUARES

(71) Applicants: John G. Gorman, Del Mar, CA (US); John W. Gorman, Del Mar, CA (US)

(72) Inventors: John G. Gorman, Del Mar, CA (US); John W. Gorman, Auckland (NZ)

( * ) Notice: Subject to any disclaimer, the term of this patent is extended or adjusted under 35 U.S.C. 154(b) by 0 days.

(21) Appl. No.: 19/361,641

(22) Filed: Oct. 17, 2025

Related U.S. Application Data

(60) Provisional application No. 63/818,466, filed on Jun. 5, 2025.

(51) Int. Cl.
*B65G 1/04* (2006.01)
*B65G 35/06* (2006.01)
*B65G 43/02* (2006.01)

(52) U.S. Cl.
CPC ........... *B65G 1/0478* (2013.01); *B65G 35/06* (2013.01); *B65G 43/02* (2013.01); *B65G 2203/0283* (2013.01)

(58) Field of Classification Search
CPC ...... B65G 1/0478; B65G 35/06; B65G 43/02; B65G 2203/0283
See application file for complete search history.

(56) References Cited

U.S. PATENT DOCUMENTS 9,056,577 B2 * 6/2015 Corrigan ............... B60P 1/4414
2011/0046775 A1 2/2011 Bailey et al.
2018/0268348 A1 9/2018 Guan
(Continued)

FOREIGN PATENT DOCUMENTS

FR 3146886 A1 * 9/2024 ............ B65G 65/00
JP S6093006 * 5/1985
(Continued)

OTHER PUBLICATIONS

JP_S6093006_EN_description_with_paragraph_numbers_espacenet (Year: 1985).*
(Continued)

*Primary Examiner* — Jacob S. Scott
*Assistant Examiner* — Erin Morris
(74) *Attorney, Agent, or Firm* — Procopio, Cory, Hargreaves & Savitch LLP

(57) ABSTRACT

Conventional conveyance systems (e.g., for warehouses) require robotic drive units, which each comprises complex and expensive on-board computer hardware, software, sensing systems, and batteries that need to be periodically recharged. Disclosed embodiments centralize the intelligence into a controller that controls pinions in the crossing squares of a two-dimensional conveyance system. The controller drives the pinions to engage with corresponding racks on the bottom of carts, to thereby move the carts between adjacent crossing squares, along optimal movement paths. This enables the carts to be "dumb" (e.g., no on-board computer hardware or software, sensing systems, or batteries), which reduces complexity and costs, and enables the carts and crossing squares to be easily and inexpensively replaced in the event of mechanical failures. In addition, the centralized controller can clear paths, move carts as trains, sense collisions, re-sort carts in the background, and otherwise optimize the operation of the two-dimensional conveyor system.

19 Claims, 9 Drawing Sheets

(56) References Cited

U.S. PATENT DOCUMENTS

| | | | | |
|---|---|---|---|---|
| 2021/0179355 | A1* | 6/2021 | Heggebø | B65G 1/0464 |
| 2023/0020576 | A1* | 1/2023 | Pepley | G06Q 10/087 |
| 2024/0076129 | A1* | 3/2024 | Stark | B65G 1/1371 |
| 2024/0345118 | A1 | 10/2024 | Gorman | |
| 2024/0409018 | A1* | 12/2024 | Chen | B60P 1/6436 |
| 2025/0019169 | A1* | 1/2025 | Malpure | B65G 1/0478 |

FOREIGN PATENT DOCUMENTS

| | | | | | |
|---|---|---|---|---|---|
| WO | WO-2020260639 | A1 | * | 12/2020 | B65G 1/1373 |
| WO | WO-2023237879 | A1 | * | 12/2023 | B65G 1/1373 |
| WO | WO-2025262088 | A1 | * | 12/2025 | B65G 1/1373 |

OTHER PUBLICATIONS

FR_3146886 w/ EN (Year: 2024).*

WO_2020260639 (Year: 2023).*

“Magic floor reinvents warehouse automation” Published by Western Business Media Limited, Posted on Sep. 2, 2024, LOGISTICSMATTERS, https://www.logisticsmatters.co.uk/article/magic-floor-reinvents-warehouse-automation/, Retrieved on Oct. 17, 2025, 4 pages.

“Modular automation for high intensity applications,” Products and Applications, Versatile webpage, https://versatileautomation.com/products-applications/, Retrieved on Oct. 17, 2025, 7 pages.

International Search Report and Written Opinion mailed Feb. 9, 2026 for International Application No. PCT/US2025/051544, 7 pages.

* cited by examiner

FIG. 3A
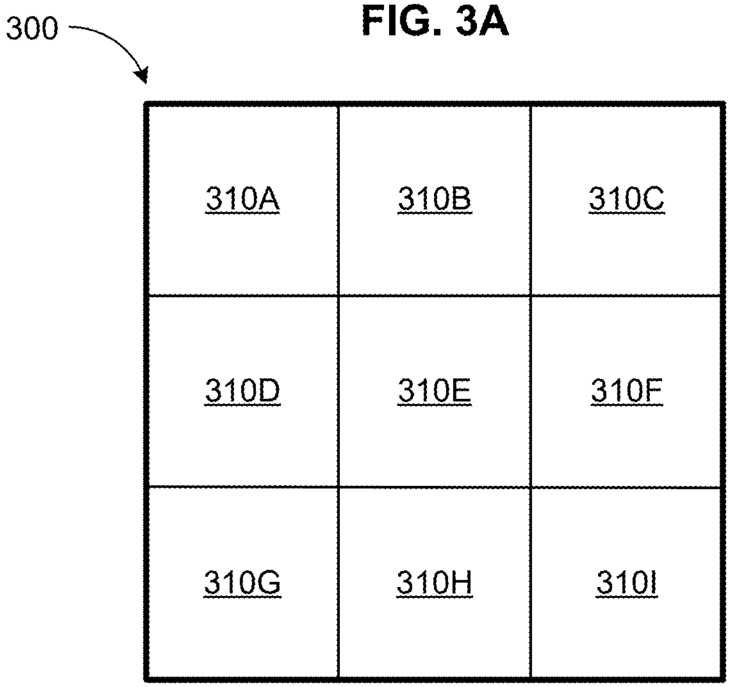
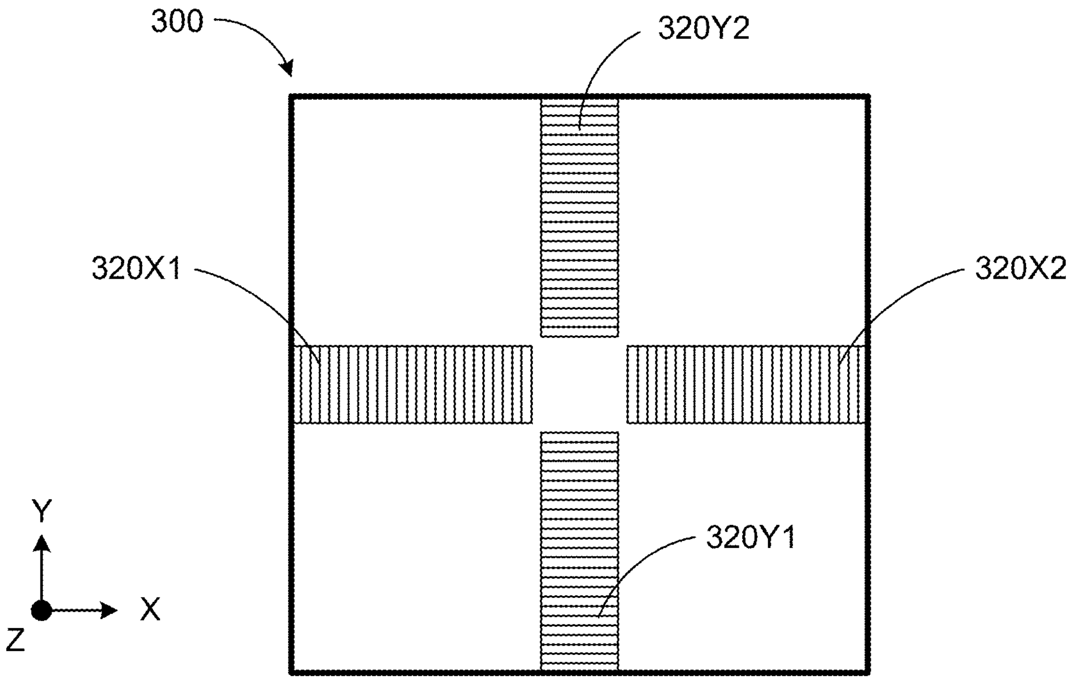
FIG. 3B

TWO-DIMENSIONAL CONVEYOR SYSTEM WITH CROSSING SQUARES

CROSS-REFERENCE TO RELATED APPLICATIONS

This application claims priority to U.S. Provisional Patent App. No. 63/818,466, filed on Jun. 5, 2025, which is hereby incorporated herein by reference as if set forth in full.

BACKGROUND

Field of the Invention

The embodiments described herein are generally directed to automated conveyors, and, more particularly, to a two-dimensional conveyor system with carts that move across crossing squares.

Description of the Related Art

The warehouses of Amazon.com, Inc., of Seattle, Washington, utilize robotic drive units, manufactured by its subsidiary, Amazon Robotics, LLC, formerly, Kiva Systems. These drive units transport entire shelving units, called pods, to human operators for picking and stowing. In particular, the drive units are designed to autonomously navigate the warehouse floor, slide underneath a pod, lift the entire pod with all of its goods, transport the pod to its destination, lower the pod at its destination, and slide out from underneath the pod.

In such a system, a lot of usable storage space remains unused. In addition, the robotic drive units are expensive and complex. Each drive unit requires an elaborate system of computer hardware and software, electric motors for four wheels, and sophisticated on-board sensing systems for navigation and collision avoidance.

In addition, each drive unit is powered by a battery that has to be routinely recharged. Not only does this require significant downtime for each robotic unit, but it also requires the warehouse to have a charging infrastructure.

SUMMARY

Accordingly, a two-dimensional conveyor system with crossing squares is disclosed. Unlike traditional systems, this two-dimensional conveyor system does not require expensive and complex robotics, batteries, or a charging infrastructure.

In an embodiment, a two-dimensional conveyor system comprises: a plurality of crossing squares arranged in both an X-dimension and a Y-dimension to form a plurality of rows and columns, wherein each of the plurality of crossing squares comprises a first pair of pinions, aligned along the X-dimension, and a second pair of pinions, aligned along the Y-dimension; a plurality of carts occupying a subset of the plurality of crossing squares, wherein a number of the plurality of carts is at least one less than a number of the plurality of crossing squares, and wherein each of the plurality of carts comprise a first pair of racks, aligned along the X-dimension and configured to engage with the first pair of pinions of each of the plurality of crossing squares, and a second pair of racks, aligned along the Y-dimension and configured to engage with the second pair of pinions of each of the plurality of crossing squares; and a controller that is configured to independently control rotation of the first pair of pinions and the second pair of pinions of each of the plurality of crossing squares.

Each of the plurality of carts may comprise a top surface that is configured to hold one or more items. The top surface of each of the plurality of carts may comprise one or more segments, wherein each of the one or more segments is configured to hold at least one of the one or more items, and wherein the one or more segments of the top surface of at least one of the plurality of carts is divided into a plurality of segments. Each item may be associated with a place-time identifier, wherein the place-time identifier associated with each item comprises: a component vector that identifies one of the plurality of carts on which the item is being held; a surface vector that identifies one of the one or more segments on which the item is being held; and a time vector that identifies a time at which the item is at a location defined by the component vector and the surface vector. The controller may be further configured to store the place-time identifier associated with each item for each of a plurality of points in time. Each of the plurality of carts may be associated with a place-time identifier, wherein the place-time identifier associated with each cart comprises: a component vector that identifies one of the plurality of crossing squares occupied by the cart; and a time vector that identifies a time at which the cart is at a location defined by the component vector. The controller may be further configured to store the place-time identifier for each cart for each of a plurality of points in time.

Each of the plurality of carts may be associated with a place-time identifier, wherein the place-time identifier associated with each cart comprises: a component vector that identifies one of the plurality of crossing squares occupied by the cart; and a time vector that identifies a time at which the cart is at a location defined by the component vector. The controller may be further configured to store the place-time identifier for each cart for each of a plurality of points in time.

The controller may be further configured to, for each of a plurality of tasks, for each of one or more of the plurality of carts that need to be moved to complete the task: determine a starting location of the cart, wherein the starting location is a first one of the plurality of crossing squares; determine a destination location of the cart, wherein the destination location is a second one of the plurality of crossing squares; determine an optimal movement path of the cart, between the starting location and the destination location, according to one or more goals; and execute the determined optimal movement path by controlling pairs of pinions along the determined optimal movement path. The one or more goals may comprise minimizing an overall number of movements, and/or minimizing an overall time required to complete the task. The optimal movement path may include one or more occupied ones of the plurality of crossing squares, wherein executing the optimal movement path comprises clearing the one or more occupied crossing squares by moving each of the plurality of carts that are on the one or more occupied crossing squares to one of the plurality of crossing squares that are not on the optimal movement path.

Each of the plurality of carts may comprise no sensors, computer processors, or computer software.

The controller may independently control rotation of each of the first pair of pinions and the second pair of pinions via a respective drive system, wherein the controller is further configured to, when controlling rotation of one of the first pair of pinions or second pair of pinions, automatically: detect an increase in energy required by the respective drive system; and in response to detecting the increase in energy, deactivate the one pair of pinions to thereby brake any cart being moved by the one pair of pinions. The controller may be further configured to, in response to detecting the increase in energy, notify an operator.

The controller may independently control rotation of each of the first pair of pinions and the second pair of pinions of each of the plurality of crossing squares via a respective drive system, wherein the controller is further configured to generate an occupation map of the plurality of crossing squares by: activating at least a subset of the first pair of pinions and the second pair of pinions of the plurality of crossing squares to detect increases in energy required by the respective drive systems; and identifying a state of each crossing square based on the increases in energy, wherein the state is one of occupied by one of the plurality of carts or unoccupied by any of the plurality of carts.

The controller may be further configured to control one or both of the first pair of pinions or the second pair of pinions of each of at least a subset of the plurality of crossing squares to: assemble a plurality of carts into a contiguous train; and move the contiguous train as a single unit within the two-dimensional conveyor system.

The controller may be further configured to re-sort the plurality of carts as a background operation by: executing an optimization algorithm to determine an optimal placement of each of the plurality of carts; and moving at least a subset of the plurality of carts, according to the optimal placement, to thereby optimize a location of each of the plurality of carts for future tasks. The optimization algorithm may determine the optimal placement based on one or more of historical access of the plurality of carts, or scheduled access of the plurality of carts.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A and 3B are top-down and bottom-up views of a cart, respectively, according to an embodiment;

DETAILED DESCRIPTION

A two-dimensional conveyor system is disclosed in various embodiments. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Two-Dimensional Conveyor System

Figure 1:
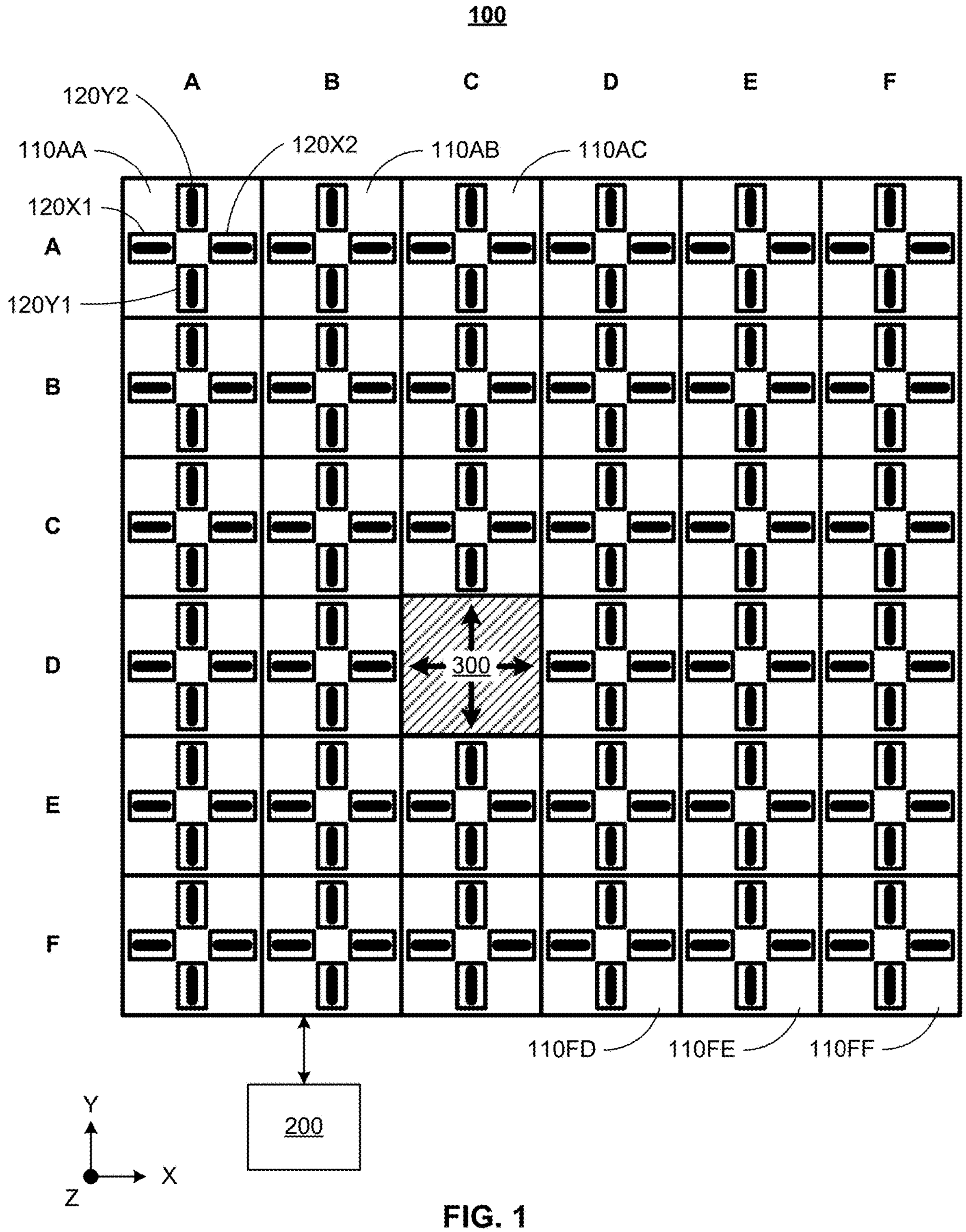
FIG. 1 illustrates a plan view of two-dimensional conveyor system, according to an embodiment.

FIG. 1 illustrates a plan view of a two-dimensional conveyor system 100, according to an embodiment. Two-dimensional conveyor system 100 may comprise a plurality of crossing squares 110, arranged in both an X-dimension and a Y-dimension, to form a plurality of rows and columns in a two-dimensional grid. Two-dimensional conveyor system 100 may be installed on or above the floor of any housing. While it is generally contemplated that the housing would be a warehouse, the housing could be another type of enclosure, such as the storage hold of a box or delivery truck, the trailer of a semi-trailer truck, a shipping container, a vending kiosk, a retail or grocery store, a laboratory machine, the cargo hold of an airplane, maritime vessel, or other vehicle, and the like.

Two-dimensional conveyor system 100 resides within a plane that contains an X-axis and a Y-axis that is orthogonal to the X-axis. It should be understood that this plane is orthogonal to a Z-axis, which is orthogonal to both the X-axis and the Y-axis. As used herein, the term “along,” when used with respect to an axis, should be understood to mean in the same orientation as or parallel to that axis, as opposed to requiring coaxiality with any particular axis. For instance, “along the X-axis” means parallel to any particular instance of the X-axis, “along the Y-axis” means parallel to any particular instance of the Y-axis, and “along the Z-axis” means parallel to any particular instance of the Z-axis. It should also be understood that the X-dimension is the dimension along the X-axis, the Y-dimension is the dimension along the Y-axis, and the Z-dimension is the dimension along the Z-axis. In addition, the X-direction may be either direction along the X-axis, the Y-direction may be either direction along the Y-axis, and the Z-direction may be either direction along the Z-axis.

Two-dimensional conveyor system 100 is illustrated as consisting of a six-by-six grid of thirty-six cross squares 110. However, in practice, two-dimensional conveyor system 100 may have any set of dimensions, including non-square dimensions. More generally, two-dimensional conveyor system 100 may have any number of crossing squares 110 in the X-dimension, as well as any number of crossing squares 110 in the Y-dimension. However, in general, two-dimensional conveyor system 100 should have a plurality of crossing squares 110 in the X-dimension, and a plurality of crossing squares 110 in the Y-dimension.

Two-dimensional conveyor system 100 is illustrated as being square or, more generally, rectangular. However, two-dimensional conveyor system 100 could have other two-dimensional shapes. Conceptually, two-dimensional conveyor system 100 can be thought of as a set of rows (i.e., along the X-axis) or columns (i.e., along the Y-axis). In the illustrated example, the rows all have the same length, and the columns all have the same length. However, in alternative examples, two or more rows may have different lengths, and/or two or more columns may have different lengths.

For the purposes of explication, the two-dimensional grid is denoted by letters A-F in both the X-dimension and the Y-dimension. Thus, for example, the crossing square 110 in the AA position is denoted crossing square 110AA, the crossing square 110 in the AB position is denoted crossing square 110AB, the crossing square 110 in the AC position is denoted crossing square 110AC and so on and so forth, such that the crossing square 110 in the FD position is denoted crossing square 110FD, the crossing square 110 in the FE position is denoted crossing square 110FE, and the crossing square 110 in the FF position is denoted crossing square 110FF.

As used herein, a reference numeral with an appended suffix will be used to refer to a specific component, whereas the same reference numeral without any appended suffix will be used to refer collectively to a plurality of the component or to refer to a generic or arbitrary instance of the component. Thus, for example, the term "crossing squares 110" refers collectively to all of crossing squares 110AA-110FF, and the term "crossing square 110" may refer to any single one of crossing squares 110AA-110FF.

In an embodiment, each crossing square 110 comprises at least four pinions 120, including two pinions 120X1 and 120X2 along the X-axis, and two pinions 120Y1 and 120Y2 along the Y-axis. The pair of pinions 120X1 and 120X2 are aligned along the X-axis, spaced apart by a distance that is generally equal to, but potentially slightly less or greater than, the width of the pair of pinions 120Y1 and 120Y2 in the X-dimension, and symmetrical across the Y-axis that bisects the space between them. Similarly, the pair of pinions 120Y1 and 120Y2 are aligned along the Y-axis, spaced apart by a distance that is generally equal to, but potentially slightly less or greater than, the width of the pair of pinions 120X1 and 120X2 in the Y-dimension, and symmetrical across the X-axis that bisects the space between them. More generally, each of the plurality of crossing squares 110 comprises a first pair of pinions 120X1 and 120X2, aligned along the X-dimension, and a second pair of pinions 120Y1 and 120Y2, aligned along the Y-dimension.

Two-dimensional conveyor system 100 may comprise a controller 200. Controller 200 may be configured to control each pinion 120 and/or each pair of pinions 120X1 and 120X2 or 120Y1 and 120Y2, independently from all other pinions 120, and in both directions along their respective axes. Thus, for example, controller 200 may control pinions 120X1 and 120X2 to, collectively, move in the positive X-direction, in one instance, and the negative X-direction in another instance. Similarly, controller 200 may control pinions 120Y1 and 120Y2 to, collectively, move in the positive Y-direction, in one instance, and the negative Y-direction in another instance. While controller 200 could be configured to independently control pinions 120X1 and 120X2 and/or independently control pinions 120Y1 and 120Y2, these pairs of pinions will typically always move in synchronization (i.e., in the same direction) with each other. In general, controller 200 is configured to independently control rotation of the first pair of pinions 120X1 and 120X2 and the second pair of pinions 120Y1 and 120Y2 of each of the plurality of crossing squares 110.

Two-dimensional conveyor system 100 may comprise one or more carts 300. Each cart 300 may be configured to move along both the X-axis and the Y-axis. In addition, each cart 300 may be configured to hold and transport at least one item as cart 300 moves in either the X-direction or Y-direction. Thus, cart 300 is capable of transporting the item(s) to any crossing square 110 within two-dimensional conveyor system 100. As will be discussed in greater detail elsewhere herein, each cart 300 may be configured to move by virtue of racks on the underside of cart 300 that engage with pinions 120. In particular, each cart 300 may comprise a first pair of racks, aligned along the X-dimension and configured to engage with the pair of pinions 120X1 and 120X2 of each of the plurality of crossing squares 110, and a second pair of racks, aligned along the Y-dimension and configured to engage with the second pair of pinions 120Y1 and 120Y2 of each of the plurality of crossing squares 110.

While only a single cart 300 is illustrated, it should be understood that two-dimensional conveyor system 100 will generally comprise a plurality of carts 300. In particular, a cart 300 may occupy (i.e., be placed above) any of crossing squares 110. Technically, two-dimensional conveyor system 100 may comprise any number of carts 300 up to one less than the total number of crossing squares 110. In other words, a plurality of carts 300 may occupy a subset of the plurality of crossing squares 110, with the number of carts 300 being at least one less than the number of the plurality of crossing squares 110. However, in such an implementation, it may become difficult to efficiently move carts 300. In practice, a significant number of crossing squares 110 may remain open (i.e., unoccupied by any cart 300). The number or percentage of carts 300 and/or open crossing squares 110 may depend on the particular application or usage of two-dimensional conveyor system 100. For instance, in applications in which speed is prioritized, fewer carts 300 may be used, whereas, in applications in which density (i.e., the number of stored items) is prioritized, more carts 300 may be used. As examples, eighty percent (80%), seventy-five percent (75%), sixty percent (60%), fifty percent (50%), thirty percent (30%), twenty-five percent (25%), fifteen percent (15%), ten percent (10%), or some other percentage of crossing squares 110, within two-dimensional conveyor system 100, may be occupied by carts 300.

2. Controller

Figure 2:
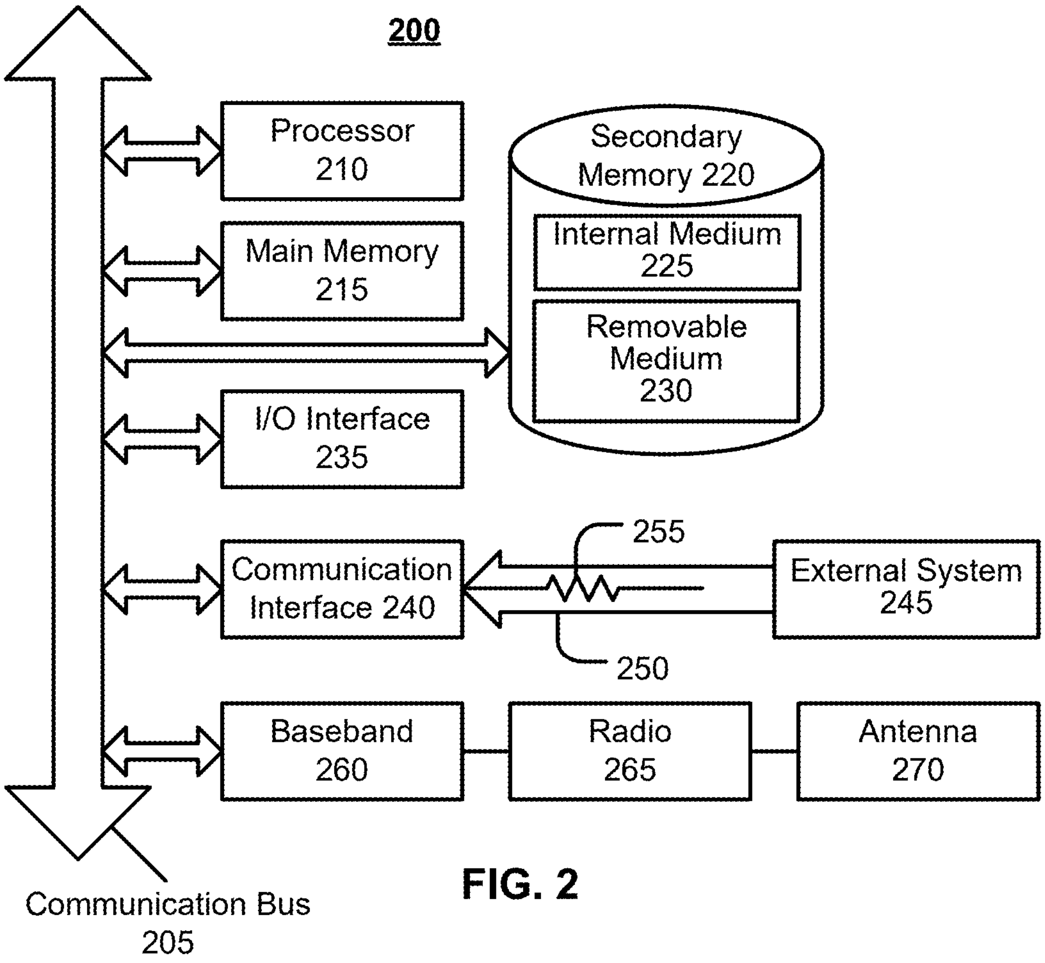
FIG. 2 illustrates a schematic of a controller, according to an embodiment.

FIG. 2 illustrates a schematic of a controller 200, according to an embodiment. Controller 200 may be used to control pinions 120 (e.g., movement in the X-direction or Y-direction) of two-dimensional conveyor system 100, as well as any other controllable components of two-dimensional conveyor system 100, according to any of the disclosed processes, which may be implemented by controller 200. Controller 200 may be capable of wired or wireless data communication, such that controller 200 is able to communicate with one or more external systems. The illustrated embodiment is simply one example of controller 200. It should be understood that controller 200 may utilize any other suitable architecture. as will be clear to those skilled in the art.

Controller 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with controller 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 may be connected to a communication bus 205. Communication bus 205 may include a data channel for facilitating information transfer between storage and other peripheral components of controller 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 200 may comprise main memory 215. Main memory 215 provides storage of instructions and data for programs executing on processor 210, such as one or more of the processes described herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 200 may comprise secondary memory 220. Secondary memory 220 is a non-transitory computer-readable medium having computer-executable code and/or other data (e.g., software implementing any of the disclosed processes) stored thereon. In this description, the term "computer-readable medium" is used to refer to any non-transitory computer-readable storage media used to provide computer-executable code and/or other data to or within controller 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

Controller 200 may comprise an input/output (I/O) interface 235. I/O interface 235 provides an interface between one or more components of controller 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display.

Controller 200 may comprise a communication interface 240. Communication interface 240 allows software and other data to be transferred between controller 200 and external devices (e.g. printers), networks, or other information sources. For example, computer-executable code and/or other data may be transferred to controller 200, over one or more networks (e.g., including the Internet and/or an intranet), from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enable controller 200 to perform the various functions of the disclosed embodiments as described elsewhere herein.

In an embodiment that is implemented using software, the software may be stored on a computer-readable medium and initially loaded into controller 200 by way of removable medium 230, I/O interface 235, or communication interface 240. In such an embodiment, the software is loaded into controller 200 in the form of electrical communication signals 255. The software, when executed by processor 210, preferably causes processor 210 to perform one or more of the processes described herein.

Controller 200 may comprise wireless communication components that facilitate wireless communication over a data network. The wireless communication components may comprise an antenna system 270, a radio system 265, and a baseband system 260. In controller 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable controller 200 to perform the various functions of disclosed processes.

Alternatively, controller 200 may be implemented as a purely hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, processes will be described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component (e.g., subprocess) are for ease of description. Specific functions can be moved from one component to another without departing from the invention.

Controller 200 may comprise a wired or wireless connection to the motor, a lift, and/or other components of the drive system of each pinion 120, to thereby activate each component and regulate the movement and motion of each pinion 120. Controller 200 may control the lift to raise and lower each pinion 120 to engage or disengage with cart 300, respectively, and control the motor to rotate an axel that rotates pinion 120 clockwise or counterclockwise, which determines the tangential direction in which cart 300 will move. The motor may be a stepper motor, and controller 200 may be configured to count and control the number of steps performed by each stepper motor. A stepper motor is an electric motor that moves in fixed angular increments, rather than spinning continuously. Controller 200 may provide input pulses to the stepper motor, with each input pulse causing the stepper motor to rotate by one discrete step. This allows precise control of position and speed without feedback sensors.

For each crossing square 110, controller 200 can independently raise, lower, activate (i.e., actuate), and deactivate the X-axis pair of pinions 120X1 and 120X2 and the Y-axis pair of pinions 120Y1 and 120Y2, to coordinate their rotation speed and direction to move a cart 300 precisely along a respective axis. Controller 200 may also monitor the energy draw of each motor to detect resistance or collisions, as discussed in more detail elsewhere herein, and deactivate the affected pinions 120 to brake a cart 300 when an abnormal energy increase is detected. Through this closed-loop control, controller 200 may synchronize, sequence, and optimize the motions of pinions 120, to translate rotary motion into smooth, bi-directional linear travel of carts 300 across two-dimensional conveyor system 100.

Controller 200 could also receive signals from one or more sensors within each crossing square 110. For example, these sensors may sense whether or not each crossing square 110 is fully occupied by a cart 300 (e.g., via a pressure or proximity sensor within crossing square 110), partially occupied by a cart 300 (e.g., via multiple pressure or proximity sensors within crossing square 110), and/or the like. Controller 200 may utilize these signals to determine and/or audit the locations of carts 300 within two-dimensional conveyor system 100.

However, in a preferred embodiment, crossing squares 110 do not comprise any sensors, and controller 200 does not require any sensors to determine whether carts 300 are located within two-dimensional conveyor system 100. In this case, each crossing square 110 may comprise a weak physical obstruction to hold cart 300 within the center of crossing square 110. Controller 200 could sense when a crossing square 110 is occupied by a cart 300 by activating a pair of pinions (e.g., 120X1 and 120X2, or 120Y1 and 120Y2) of crossing square 110, and detecting whether or not there is a small increase in energy required to drive the pair of pinions 120. An increase in energy would indicate the resistance caused by trying to push cart 300 over the weak physical barrier. If the increase in energy is detected, controller 200 may determine that crossing square 110 is occupied by cart 300, and deactivate the pair of pinions to prevent actual movement of cart 300 beyond the weak physical barrier.

3. Example Cart

FIG. 3A illustrates a top-down view of cart 300, according to an embodiment. Each cart 300 may comprise a top surface that is configured to hold one or more items. In an embodiment, the top surface of each cart 300 comprises one or more segments 310. Each segment 310 is configured to hold one or more items, including potentially only a single item or a plurality of items (e.g., a set of fungible items). In the illustrated example, the top surface of cart 300 is divided into a plurality of segments 310, and specifically, nine segments 310A, 310B, 310C, 310D, 310E, 310F, 310G, 310H, and 310I. In addition, as will be discussed elsewhere herein, each segment 310 may be associated with an identifier that is unique, relative to every other segment 310 in the same surface of the same cart 300 or every other segment 310 in the same cart 300, regardless of surface. Each segment 310 may have an X-Y address that can be used by a simple robot picker to determine arm placement for picking an item from segment 310 or stowing an item on segment 310.

In practice, the top surface of cart 300 may comprise any number of segments 310, and may potentially consist of a single segment 310. In an embodiment in which the top surface of cart 300 comprises a plurality of segments 310, all segments 310 may have the same dimensions (e.g., same X-dimension and Y-dimension), or one or more segments 310 may have different dimensions than one or more other segments 310. In addition, while all segments 310 are illustrated as squares, segments 310 may have different shapes (e.g., circles, triangles, rectangles, pentagons, hexagons, irregular polygons, etc.).

Every cart 300, within two-dimensional conveyor system 100, may have the same number and arrangement of segments 310. Alternatively, one or more carts 300, within two-dimensional conveyor system 300, may have a different number or arrangement of segments 310 than one or more other carts 300, within the same two-dimensional conveyor system 100.

Each segment 310 may have physical dividers (e.g., partitions, lips, ribs, etc.) at its respective boundaries, to demarcate that segment 310 from any neighboring segments 310 and/or the edge of the top surface of cart 300. These physical dividers may be fixed, or removable and/or rearrangeable. Alternatively, segments 310 may be logical X-Y segments of the top surface with no visible physical divisions.

Segments 310 may be redefinable, potentially dynamically or on the fly. In particular, during operation or between operations of two-dimensional conveyor system 100, the logical segments 310 in the top surface of a cart 300 may be resized or rearranged. As an example, segments 310A, 310B, and 310C could be merged into a single segment 310. In this case, the identifiers of segments 310 may be appropriately modified, such that only a single identifier is assigned to the new segment 310, consisting of previously separate segments 310A, 310B, and 310C.

In an embodiment, the top surface of cart 300 may be magnetic. In this case, ferrous trays or ferrous items may be releasably fixed to a segment 310 on the top surface of cart 300. This can be used to ensure that the items on the top surface of cart 300 remain at a precise location, even during movement of cart 300. Notably, the items themselves do not need to be ferrous. For example, the items may be arranged in ferrous trays. Alternatively, the items may themselves be ferrous.

Only a single level of cart 300 is illustrated. However, cart 300 may comprise a plurality of levels, with each level forming a top surface of cart 300 having one or more segments 310. For example, cart 300 may comprise a plurality of shelves, stacked along the Z-axis. Each shelf may have a top surface comprising one or more segments 310, configured to hold items. Shelves and segments 310 may be designed, with physical dividers, extending upward along the Z-axis, or magnetism, to prevent items from sliding around or falling off cart 300 during movement of cart 300.

FIG. 3B illustrates a bottom-up view of cart 300, according to an embodiment. The bottom surface of cart 300 may comprise at least four racks 320, including two racks 320X1 and 320X2 along the X-axis, and two racks 320Y1 and 320Y2 along the Y-axis. The pair of racks 220X1 and 320X2 are aligned along the X-axis, spaced apart by a distance that is generally equal to, but potentially slightly less or greater than, the width of the pair of racks 320Y1 and 320Y2 in the X-dimension, and symmetrical across the Y-axis that bisects the space between them. Similarly, the pair of racks 320Y1 and 320Y2 are aligned along the Y-axis, spaced apart by a distance that is generally equal to, but potentially slightly less or greater than, the width of the pair of racks 320X1 and 320X2 in the Y-dimension, and symmetrical across the X-axis that bisects the space between them.

Racks 320 on the bottom surface of cart 300 align and engage with corresponding pinions 120 on the top surface of each crossing square 110. Thus, as controller 200 operates a pair of pinions 120X1 and 120X2 to move in a direction along the X-axis, pinions 120X1 and 120X2 will engage with racks 320X1 and 320X2, to thereby push cart 300 in that X-direction. Similarly, as controller 300 operates a pair of pinions 120Y1 and 120Y2 to move in a direction along the Y-axis, pinions 120Y1 and 120Y2 will engage with racks 320Y1 and 320Y2, to thereby push cart 300 in that Y-direction.

Notably, at the start of movement along a particular axis, both pinions 120, along that axis, within the starting crossing square 110, will be engaged with corresponding racks 320 on the bottom surface of cart 300. However, in the middle of the movement, only one pinion 120 of the starting crossing square 110 will be engaged with a rack 320 on the bottom surface of cart 300, while a pinion 120 of the destination crossing square 110 will become engaged with the other rack 320 on the bottom surface of cart 300. For example, assume that cart 300 begins on crossing square 110AA and is to be moved, along the X-axis, to crossing square 110AB. In this case, pinions 120X1 and 120X2 will move, in synchronization, in the positive X-direction from crossing square 110AA to crossing square 110AB. Since pinions 120X1 and 120X2 are engaged with racks 320X1 and 320X2, respectively, cart 300 will begin moving in the positive X-direction. Later during this movement, rack 320X1 will disengage with pinion 120X1 of crossing square 110AA and engage with pinion 120X1 of crossing square 110AB, while rack 320X2 disengages with pinion 120X2 of crossing square 110AA and engages with pinion 120X1 of crossing square 110AA. Even later during this movement, rack 320X2 will disengage with pinion 120X1 of crossing square 110AB and engage with pinion 120X2 of crossing square 110AB, while rack 320X1 disengages with pinion 120X2 of crossing square 110AA and engages with pinion 120X1 of crossing square 110AB. At the end of the movement, pinions 120X1 and 120X2 of crossing square 110AB are engaged with racks 320X1 and 320X2, respectively, of cart 300.

Although not illustrated, in an embodiment, each cart 300 may comprise a bumper around its periphery. In particular, a bumper may extend outwardly, as a protrusion, from each side of cart 300. It should be understood that there will four bumpers, comprising a first bumper that extends outwardly, from a first side surface in the Y-Z plane, in one X-direction, a second bumper that extends outwardly, from a second side surface in the Y-Z plane, in the other X-direction, a third bumper that extends outwardly, from a third side surface in the X-Z plane, in one Y-direction, and a fourth bumper that extends outwardly, from a fourth side surface in the X-Z plane, in the other Y-direction. In other words, cart 300 is protected by a bumper on each of its four sides. Each bumper may comprise or consist of a dampening material, such as rubber, soft plastic, or the like. The bumpers prevent carts 300 from damaging each other in the event of a collision between carts 300, or damaging other objects that may be on a crossing square 110.

4. Rack-and-Pinion System

Figure 4:
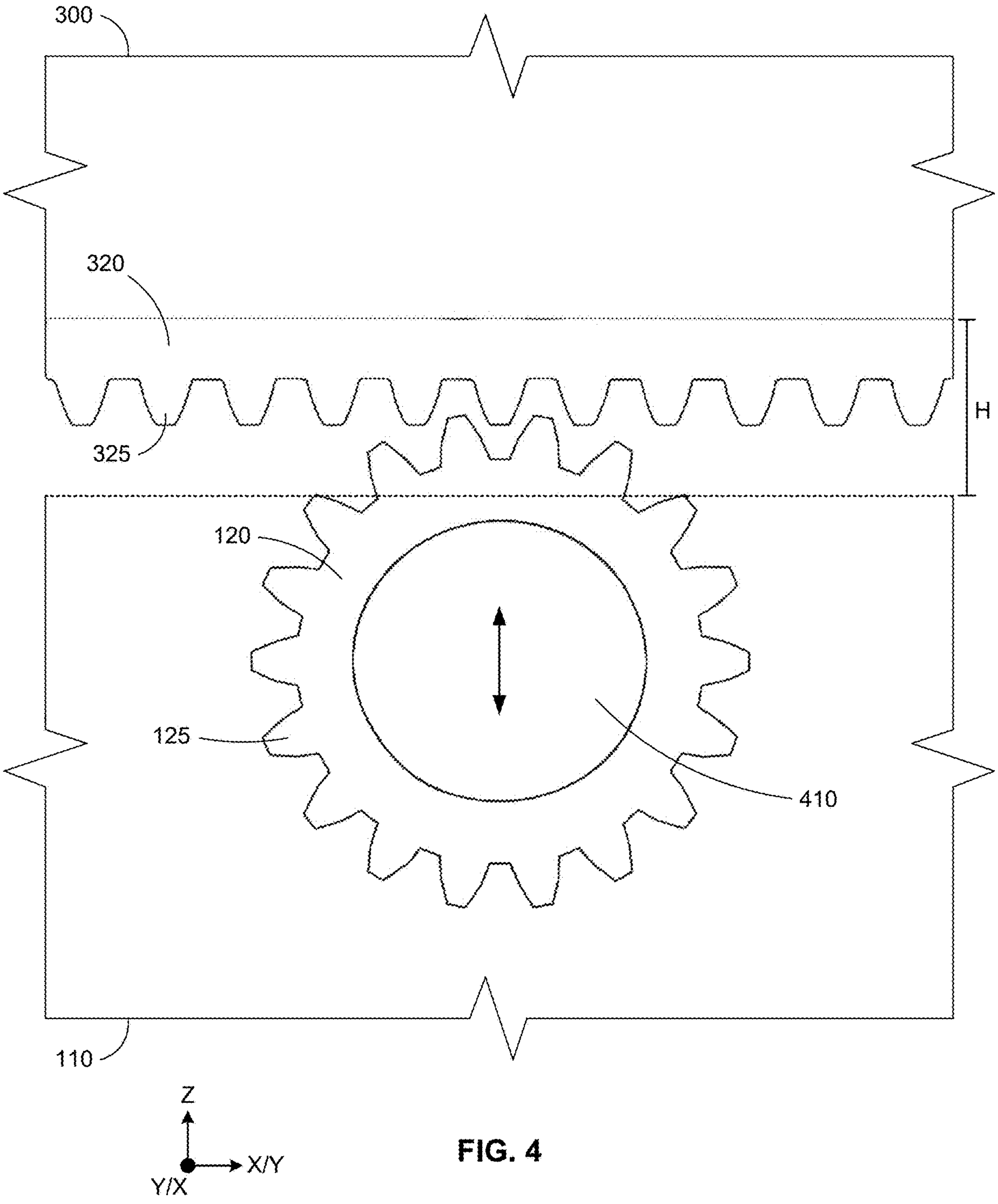
FIG. 4 illustrates a rack-and-pinion system, according to an embodiment.

FIG. 4 illustrates a rack-and-pinion system that may be used between crossing squares 110 and carts 300, according to an embodiment. While a particular arrangement of a rack 320 and pinion 120 is illustrated, it should be understood that other arrangements are possible, and that the specific shapes and relative dimensions of the illustrated components are not limiting.

Each rack 320 on the bottom surface of each cart 300 may comprise a plurality of teeth 325 arranged linearly along the respective axis. For example, teeth 325 of racks 320X1 and 320X2 are interspersed (e.g., at equidistant intervals with gaps in between) along the X-axis, while the longitudinal axis of each individual tooth 325 extends orthogonally along the Y-axis. Similarly, teeth 325 of racks 320Y1 and 320Y2 are interspersed (e.g., at equidistant intervals with gaps in between) along the Y-axis, while the longitudinal axis of each individual tooth 325 extends orthogonally along the X-axis.

Each pinion 120 of each crossing square 110 may comprise a plurality of teeth 125 extending from a hub frame. The hub frame of each pinion 120 may be fixed to an axel 410, which is driven to rotate by an electric motor (e.g., stepper motor) under the control of controller 200, to thereby rotate pinion 120. Controller 200 may be configured to raise and lower each axel 410 via any suitable mechanism, to thereby raise and lower pinion 120. Controller 200 may also be configured to activate the electric motor to rotate axel 410 in either of the clockwise or counterclockwise directions, such that axel 410 can be rotated in both directions, depending on the intended direction of movement. It should be understood that any motor capable of providing rotational energy to axel 410 may be used. However, in a preferred embodiment, the motor is a stepper motor that allows for precise positioning and synchronization (e.g., placement of cart 300 directly over the center of a crossing square 110). The motor and axel 410 for each pinion 120 represents the drive system for that pinion 120.

As controller 200 drives the motor to rotate axel 410, pinion 120 rotates in the same rotational direction as axel 410. As pinion 120 rotates, teeth 125 of pinion 120 engage with teeth 325 of rack 320. In particular, the front surface of each tooth 125, as defined by the rotational direction, will engage with the rear surface of each tooth 325, as defined by the rotational direction, to thereby push tooth 325. This, in turn, pushes rack 320, which in turn pushes cart 300, along either the X-axis or Y-axis, depending on the orientation of pinion 120 and rack 320.

While pinion 120 is illustrated as having a generally circular shape and rotating with a circular axel 410, pinion 120 could be have a different shape and be configured to rotate in a different manner. For example, pinion 120 could comprise an elliptical shape that is rotated by two or more axels 410, identical or similar to the track-and-roller systems on industrial machines, such as bulldozers. Regardless of the particular mechanism of rotation, the system of rack 320 and pinion 120 enables pinions 120 of each crossing square 110 to move a cart 300 to an adjacent crossing square 110, under the control of controller 200.

When not activated by controller 200, pinions 120 may be recessed within crossing square 110, such that teeth 125 are below the top surface of crossing square 110 and are not able to engage with any feature on the bottom surface of cart 300. When activated, pinion 120 may rise above the top surface of crossing square 110 to engage with any aligned rack 320 above pinion 120. When pinions 120X1 and 120X2 of crossing square 110 are active, pinions 120Y1 and 120Y2 may be inactive and recessed, such that cart 300 can move freely in an X-direction without risk of being caught on teeth 125 of pinions 120Y1 or 120Y2. Similarly, when pinions 120Y1 and 120Y2 of a crossing square 110 are active, pinions 120X1 and 120X2 may be inactive and recessed, such that cart 300 can move freely in a Y-direction without risk of being caught on teeth 125 of pinions 120X1 and 120X2.

In an embodiment, the bottom surface of each cart 300 may comprise ball bearing "wheels" (not shown) or other mechanism between the bottom surface of cart 300 and the top surface of crossing square 120. The height H of the mechanism may be configured to lift the bottom surface of cart 300 above the top surface of crossing square 110, such that that when pinions 120 are inactive, teeth 325 do not catch on any teeth 125, and when pinions 120 are active, teeth 325 do catch on teeth 125. For example, the mechanism may comprise ball bearings that roll within a first linear track that is recessed into the bottom surface of cart 300 and a second linear track that is recessed into the top surface of crossing square 110 and faces the first linear track. The ball bearings may having a diameter equal to or greater than H so as to be held between the two linear recessed tracks. Such a mechanism allows cart 300 to slide smoothly in both X-directions and both Y-directions, while the corresponding pinions 120 are active.

5. Place-Time Identification

In an embodiment, place-time identifiers (PTIDs) are used to identify all items within two-dimensional conveyor system 100. PTID allows controller 200 to register every stored item, and, at each of a plurality of points in time, including the current time, the cart 300 on which the item is stored, optionally the segment 310 on which the item is stored on that cart 300, and the location of that cart 300 within two-dimensional conveyor system 100—and particularly, the crossing square 110 on which that cart 300 is located. This allows controller 200 to track every item's movement and every other event that takes place within two-dimensional conveyor system 100, and store a detailed history of operations for two-dimensional conveyor system 100. This makes it possible to schedule each time period's (e.g., day's) operations at a high level of detail and granularity. It also makes it possible to create a detailed computer model that accurately tracks the physical operation of two-dimensional conveyor system 100 in real time. In addition, data analytics can be applied to the tracked data to enable vast improvements in system efficiency.

As discussed herein, items may be stored on a segment 310 (e.g., defined by an X-Y position) on the top surface of a cart 300 that is capable of moving to any crossing square 110 in two-dimensional conveyor system 100. This eliminates the need for distinct storage shelves or pods. In an embodiment, each item, each segment 310, each cart 300, and/or the like is associated with a PTID. For simplicity, all of the items, segments 310, carts 300, or other components that are associated with a PTID may be referred to herein collectively as "entities" or singularly as an "entity."

Each PTID for an entity may comprise at least an entity identifier, the location of the entity with respect to the X-dimension and Y-dimension of two-dimensional conveyor system 100 (e.g., represented as a pairing of an X-coordinate with a Y-coordinate), and the time at which the entity was at the location. A PTID may comprise or be associated with other attributes of the entity, as well. These other attributes may depend on the particular entity being identified. For example, a PTID for an item may contain an identifier of the item (e.g., name, Stock Keeping Unit (SKU), unique numerical identifier, etc.), the date that the item entered two-dimensional conveyor system 100, an expiration date of the item, a size of the item, a weight of the item, and/or the like, whereas the PTID for a cart 300 may contain an identifier of the cart 300, the identifiers of all segments 310 on the top surface of the cart 300, a map of segments 310 on the top surface of the cart 300, a service schedule for the cart 300, and/or the like. In practice, the PTID may comprise a tuple of values representing each of these attributes.

PTIDs enable controller 200 to move items, stored on carts 300, en masse, identified solely by their location and time. Controller 200 can deliver individual items or groups of items to specific, fixed destinations, in parallel, at a specified time, with a sequence of simple one-dimensional movements that do not require any navigation. At all times, controller 200 knows what item(s) have to move, where each item is within two-dimensional conveyor system 100, as well as where and when to move each item. After each change in location of an entity (e.g., as cart 300 is moved from one crossing square 110 to an adjacent crossing square 110), the old PTID for the entity may be stored (e.g., in secondary memory 220), and the current PTID may be updated to reflect the current location of the entity and the current time.

PTIDs also enable controller 200 to model and identify events. Thus, controller 200 may schedule, track, execute, and log all events. Monitored events may include each movement of a cart 300 between a pair of adjacent crossing squares 110, the placement of a new item on a segment 310 of a cart 300 (e.g., at an ingress point of two-dimensional conveyor system 100), the removal of an item from a segment 310 of a cart 300 (e.g., at an egress point of two-dimensional conveyor system 100), the movement of an item between two segments 310 of the same cart 300 or different carts 300, and/or any other event occurring within two-dimensional conveyor system 100. Controller 200 may maintain a real-time model of what is occurring in two-dimensional conveyor system 100, to be used for modeling past and future events of two-dimensional conveyor system 100, as well as to, for example, identify crossing squares 110, carts 300, and/or other components that need servicing, items that have expired and should be removed from two-dimensional conveyor system 100, and/or the like.

PTIDs provide extreme flexibility. For example, during a normal operation within two-dimensional conveyor system 100, in which carts 300 are being moved for a first task (e.g., re-sorting), an urgent second task (e.g., removal of an item from two-dimensional conveyor system 100) may need to be performed. In this case, the first task may be instantly paused and the PTIDs saved, so that the second task can be performed. After the second task has been completed, controller 200 can return all carts 300 to their locations at the time that the first task was paused, as represented by their saved PTIDs, and then resume the first task. Thus, unlike conventional systems which are first-come-first-serve, PTIDs allow flexibility in the order in which operations can be performed by allowing two-dimensional conveyor system 100 to return to a previous state (e.g., by saving and recalling the PTIDs for that state).

In an embodiment, each PTID comprises a vector. In turn, the vector of a PTID may comprise a plurality of sub-vectors. These sub-vectors may include, without limitation, a C-vector, an S-vector, a G-vector, a T-vector, and/or a W-vector. However, it should be understood that the PTID may comprise fewer, more, or different sub-vectors. For example, additional sub-vectors may be added to PTIDs in order to pack additional information into the PTID (e.g., to improve operations).

Each C-vector or component vector may comprise or consist of a one-dimensional vector that indicates on which specific component an entity is located. For example, the C-vector for a crossing square 110 may comprise a unique identifier of the two-dimensional conveyor system 100 in which the crossing square 110 is located (e.g., if a plurality of two-dimensional conveyor systems 100 exist within a larger overarching system). The C-vector for a cart 300 may comprise a unique identifier of the crossing square 110 on which the cart 300 is located. The C-vector for an item may comprise a unique identifier of the cart 300 on which the item is placed.

Each S-vector or surface vector may comprise or consist of a set of one or more coordinates, referred to herein as S-coordinates, that identify a fixed position of the entity on the component that is identified by the C-vector. For example, the S-vector for a cart 300 may comprise an X-coordinate representing the location of the cart 300 in the X-dimension, and a Y-coordinate representing the location of the cart 300 in the Y-dimension of two-dimensional conveyor system 100. The S-vector for an item may comprise a unique identifier of the segment 310 on which the item is held, which, in the case that segments 310 are arranged in a grid pattern, could also be defined by a set of X-Y coordinates. In either case, the S-vector may represent a position of the entity on the surface of the component that is identified by the C-vector.

Each G-vector or ground vector may comprise or consist of a set of one or more coordinates, referred to herein as G-coordinates, that identify a position about a fixed origin point on the ground (e.g., the ground surface under two-dimensional conveyor system 100). In an embodiment, the G-vector comprises Cartesian X and Y coordinates in two-dimensional Euclidean space, about the fixed origin point. Each set of X-Y coordinates in the G-vector represents a unique position on the ground. In an embodiment, each G-vector comprises real-world Global Positioning System (GPS) coordinates (e.g., latitude and longitude, and optionally elevation) or similar coordinates defined for a particular space (e.g., housing of two-dimensional conveyor system 100).

Each T-vector or time vector may comprise or consist of a time coordinate (e.g., timestamp). Each time coordinate represents a point on a time axis, defining a real time or an elapsed time (e.g., from a fixed, starting point in time, like a stop-watch), and can be used to monitor individual tasks. For example, the T-vector may be used to instruct controller 200 to schedule delivery of an item to a particular location (e.g., crossing square 110) at a particular time. The T-vector can also be used to perform triage, such as prioritizing tasks (e.g., movements of various items), and dealing with the most important (e.g., time-sensitive) tasks first. The T-vector also allows for all events (e.g., movements, processing, etc.) to be scheduled and logged. The T-vector enables a history of past operations in two-dimensional conveyor system 100 to be collected and stored, as well as the projection and scheduling of future operations. The history of past operations may be used for data analytics, for example, to optimize the efficiency of two-dimensional conveyor system 100. Notably, the T-vector may represent a past time (i.e., indicating a historical PTID of the entity), a current time (i.e., indicating the current PTID of the entity), or a future time (i.e., representing the planned or scheduled PTID of the entity).

Each W-vector or "what" vector may comprise or consist of a vector that indicates what the represented entity is. For example, the W-vector may comprise an identifier that identifies the represented entity as an item or type of item, an event, a segment 310 of a cart 300, a cart 300, or other component of two-dimensional conveyor system 100, and/or the like. In other words, the W-vector indicates what kind of entity the PTID is identifying. As such, the W-vector is a coordinate in another dimension that represents a type classification. The W-vector allows controller 200 to identify what type of entity is being identified by a particular PTID, for example, so that controller 200 can distinguish between the different entities.

Each PTID may comprise a PTID vector that includes one or more, including potentially all or any subset, of the disclosed vectors. At the very least, the PTID vector may comprise an identifier of the entity, an X-coordinate representing the location of the entity in the X-dimension, a Y-coordinate representing the location of the entity in the Y-dimension, and a timestamp representing the time at which the entity is at the location defined by the X-coordinate and the Y-coordinate. In the event that the entity is an item, the PTID vector should also comprise an identifier of the segment 310 on which the item is held at the time represented by the timestamp.

In general, each of the plurality of items in two-dimensional conveyor system 100 will be associated with a PTID, and the PTID, for each of the plurality of items held on the top surface of a cart 300, may comprise at least a C-vector that identifies the cart 300 on which the item is being held, an S-vector that identifies a relative location (e.g., segment 310) of the item on the top surface of cart 300, and a T-vector that identifies a time at which the item is being held on the component identified in the C-vector at the relative location identified in the S-vector. Thus, in an embodiment, each PTID associated with each item comprises a component vector that identifies one of the plurality of carts 300 on which the item is being held, a surface vector that identifies one of the one or more segments 310 on which the item is being held, and a time vector that identifies a time at which the item is at a location defined by the component vector and the surface vector. Controller 200 may be configured to store the PTID associated with each item for each of a plurality of points in time, which may include one or more past time points, the current time point, and/or one or more future time points.

In addition, each cart 300 in two-dimensional conveyor system 100 may be associated with a PTID. The PTID associated with each cart 300 may comprise at least a component vector that identifies the crossing square 110 occupied by cart 300, and a time vector that identifies the time at which the cart 300 is at the location defined by the component vector. Controller 200 may be configured to store the PTID for each cart 300 for each of a plurality of points in time, which may include one or more past time points, the current time point, and/or one or more future time points.

Each segment 310 could also have its own system of S-coordinates. For example, each segment 310 may have its own Euclidean space, defined by X and Y coordinates. Thus, once the S-vector of a segment 310 is specified, the S-coordinates in the S-vectors of all of the PTIDs for all items on that segment 310 can be computed based on the S-coordinate system of the segment 310. In other words, the segments 310 in Euclidean space may be defined by a set of S-coordinates (e.g., a listing of S-coordinates or a range of S-coordinates). One or more S-coordinates from this set of S-coordinates for a segment 310 can be assigned to individual items on the segment 310. A large item may be assigned multiple S-coordinates if it takes up an area covering multiple S-coordinates. Alternatively, such an item may be assigned a single S-coordinate that represents the "center of gravity" of such an item. Essentially, each segment 310 can be segmented into its own system of segments holding items or portions of items.

In the manner described above, an item can be associated with a PTID, so that its exact location throughout two-dimensional conveyor system 100 can be tracked by controller 200. In other words, the exact location of an item within two-dimensional conveyor system 100 can be identified using its assigned PTID. Controller 200 tracks the PTIDs of all items within two-dimensional conveyor system 100 at all times, and may control their movements without human intervention.

Relational databases (e.g., stored in secondary memory 220) may be used to track items via their PTIDs. Specifically, each item may be associated in a relational database with a PTID. The PTID may be used as an index or key into the relational database of items. For example, an S-vector may be used as an index into a table of items, to retrieve all or a subset of information about one or more items having that S-vector. Alternatively or additionally, a combination of a C-vector, S-vector, and/or T-vector may be used as an index into the table of items. Alternatively or additionally, any other sub-vectors or combination of sub-vectors or any indicium reading (e.g., captured by a reading system) may be used as an index into the table of items. The items may be associated, in the relational database, with other data as well, such as an item identifier (e.g., SKU), one or more item descriptors (e.g., weight, size, shape, etc.), and/or the like. A relational database may persistently record every movement of every item and/or cart 300 as an event. For example, a row may be stored in a movement table that identifies the entity that was moved, the PTID at the start of the movement, the PTID at the end of the movement, the time of the movement, and/or the like. This history of movements can be used for a variety of applications, including auditing, debugging, calculating royalties for use of two-dimensional conveyor system 100, and/or the like.

Two-dimensional conveyor system 100 enables random access of any segment 310 on any cart 300. For example, each segment 310 may be individually addressed by a PTID. Controller 200 may receive an instruction for random access to a segment 310. The instruction may comprise an identifier of the C-vector or full PTID of the segment 310, and may be received from another component of two-dimensional conveyor system 100, from an external system 245, from an operator via a graphical user interface of two-dimensional conveyor system 100, and/or the like. If the instruction comprises an identifier of an item or segment 310, controller 200 may map the identifier to a C-vector or full PTID that identifies the cart 300 on which the item or segment 310 is located. Otherwise, if the instruction comprises the C-vector or full PTID, this C-vector or PTID readily identifies the cart 300 to be randomly accessed to controller 200. In either case, once the cart 300 has been identified, controller 200 may then control the identified cart 300, comprising the segment 310 to be accessed, to move the segment 310 into a position in which it may be accessed (e.g., by a human or robot) from an external environment (i.e., external to two-dimensional conveyor system 100). For example, the access position may be a crossing square 110 that is accessible from a loading area (e.g., for stowing or picking), representing an ingress and/or egress point for items and/or carts 300 in two-dimensional conveyor system 100. In other words, both items and carts 300 may introduced into or extracted from two-dimensional conveyor system 100 via one or more externally accessible crossing squares 110. It should be understood that, for efficiency, the externally accessible crossing square 110 will generally be on an edge, including potentially a corner, of two-dimensional conveyor system 100. However, in an alternative embodiment, a crossing square 110, within the interior or two-dimensional conveyor system 100, may be externally accessible (e.g., via an overhead structure or system, such as a robotic arm).

A tuple of a C-vector, S-vector, and T-vector can be thought of as a metonymous name or key that labels and identifies an item, and which controller 200 can use to specify and control operations within two-dimensional conveyor system 100. The inclusion of a W-vector in this tuple could name the item. Advantageously, PTIDs allow controller 200 to identify many disparate types of entities by vector values. Controller 200 may execute artificial intelligence (AI) algorithms, such as machine-learning algorithms, that use this PTID-based knowledge of items to self-optimize two-dimensional conveyor system 100.

As discussed elsewhere herein, controller 200 may track and update each PTID of any moving entity by monitoring positions of carts 300. During this tracking, controller 200 may also dynamically update the T-vector of the PTID for the moving entity. Thus, controller 200 can track any moving entity, both as to its current location and its future location at any particular moment in time. In addition, controller 200 may store a history of all movements, operations, and/or other events within two-dimensional conveyor system 100 (e.g., in secondary memory 220). It should be understood that this history may comprise all events up to the current time. In addition, controller 200 can store all scheduled events for the future (e.g., in secondary memory 220). Thus, controller 200 can use this constantly updated information to identify where any particular entity has been, is, or will be, at any given point in time.

As long as an item is positioned on a particular cart 300, there is generally no need to continue tracking the item via reading systems, since the location of the item may be fixed at its associated S-vector for the duration of its use. Thus, advantageously, since items are processed in place, once an item's position has been identified once (e.g., by reading its associated barcode or other machine-readable indicia at a particular C-vector and S-vector, for example, during loading), it does not need to be identified again. The preferred operating principle is to establish PTIDs of items as early in the process as possible, and just once.

However, in an embodiment, controller 200 performs quality control on the PTIDs. For example, automated reading stations (e.g., implementing optical or mechanical scanning mechanisms) may be positioned selectively throughout two-dimensional conveyor system 100 to read machine-readable indicia (e.g., Quick Response (QR) codes) on passing items, segments 310, carts 300, or other entities, to confirm that the identity being provided by the PTID is correct. Specifically, the machine-readable indicia may be used to retrieve an entity and its PTID, and the retrieved PTID may be compared to the PTID that corresponds to the position in front of the automated reading station that captured the machine-readable indicia, according to the tracking by controller 200. If the PTIDs match, then the PTIDs are aligned with reality. Otherwise, if the PTIDs do not match, then the PTIDs are misaligned, and a recalibration process may be initiated, an immediate alarm (e.g., indicating a malfunction) may be raised (e.g., sounded or sent to a human operator), and/or the like. Instances of PTID verification can be done as a statistical sampling, to ensure that the PTID system is properly aligned, thereby providing continuous confidence in the integrity of the PTIDs.

6. Control Process

Figure 5:
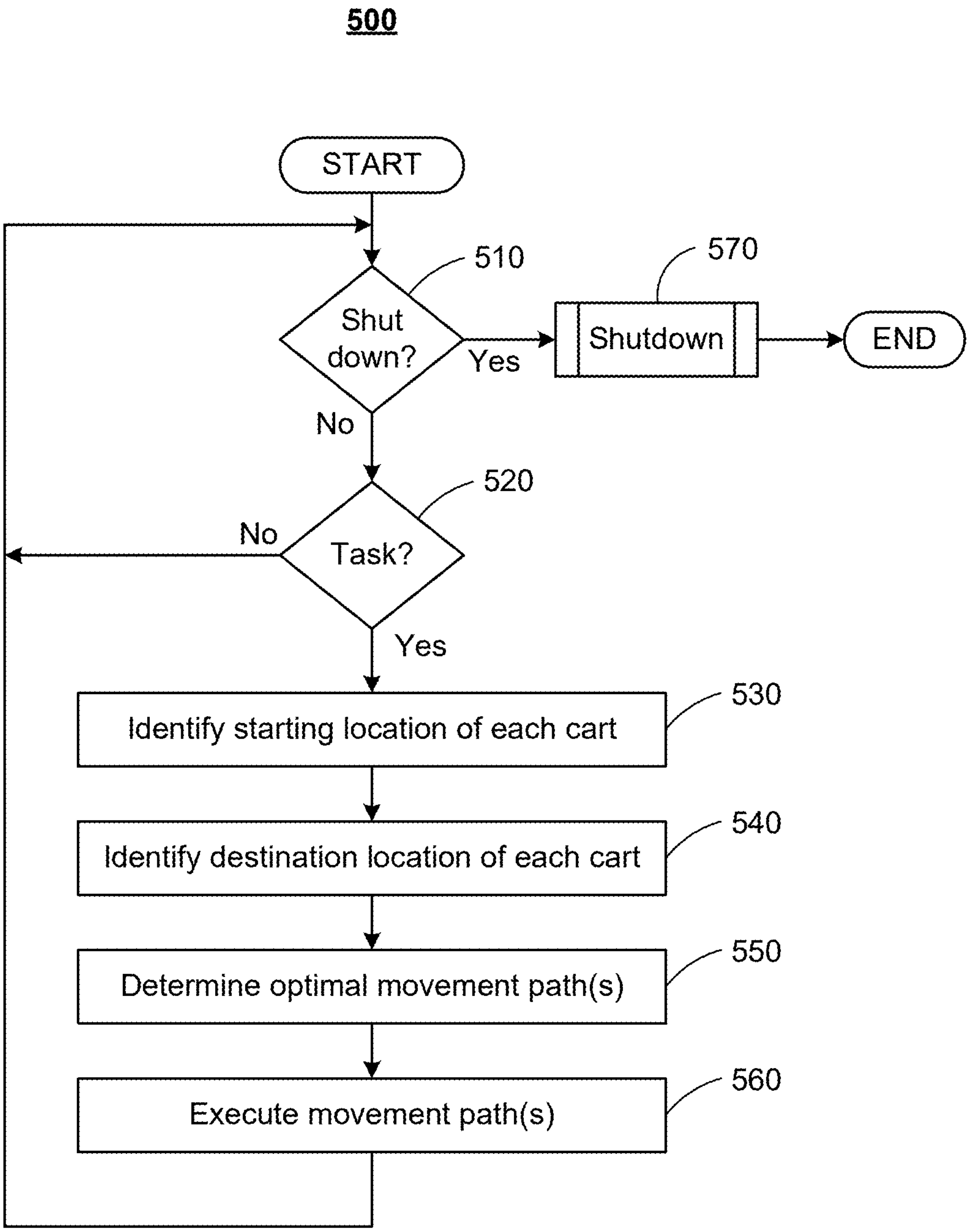
FIG. 5 illustrates a process for control of a two-dimensional conveyor system, according to an embodiment.

FIG. 5 illustrates a process 500 for control of two-dimensional conveyor system 100 by controller 200, according to an embodiment. In a preferred embodiment, process 500 is implemented as software that is executed by one or more hardware processors 210 of controller 200. Process 500 may be initiated when two-dimensional conveyor system 100 is turned on, and may continue for as long as two-dimensional conveyor system 100 remains on. While process 500 is illustrated with a certain arrangement and ordering of subprocesses, process 500 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Subprocess 510 may determine whether or not to shut down two-dimensional conveyor system 100. It may be determined to shut down two-dimensional conveyor system 100 in response to a manual local operation (e.g., depression of a physical power button, selection of a virtual power button in a graphical user interface on a touch-panel display of two-dimensional conveyor system 100, etc.), manual remote operation (e.g., selection of a virtual power button in a graphical user interface of an external system 245 that is communicatively connected to controller 200 via communication interface 240), the occurrence of an automated trigger (e.g., a scheduled shutdown in a predefined operation schedule), the occurrence of a power outage, and/or the like. When not determining to shutdown (i.e., "No" in subprocess 510), process 500 may proceed to subprocess 520. Otherwise, when determining to shutdown (i.e., "Yes" in subprocess 310), process 500 may proceed to subprocess 570.

Subprocess 520 may determine whether or not a task, involving the movement of one or more carts 300 within two-dimensional conveyor system 100, is to be performed. Such a task may comprise moving an item or segment 310 on a single cart 300 from one location to another location, moving a plurality of items or segments 310 on the same cart 300 from one location to another location, moving a plurality of items or segments 310 on different carts 300 from respective starting locations to respective destination locations, or the like, within two-dimensional conveyor system 100. Tasks may be performed according to a predefined operation schedule that may be manually defined by an operator of two-dimensional conveyor system 100 and/or automatically determined by controller 200 or an external system 245. Alternatively or additionally, tasks may be performed in response to the reception of a new order by controller 200, a local or remote manual operation, the occurrence of an event that triggers a new task, and/or the like. It should be understood that tasks and movements may be performed in parallel when possible. In other words, a plurality of iterations of subprocesses 520-560 may be performed in parallel. When determining that a task that involves the movement of one or more carts 300 is to be performed (i.e., "Yes" in subprocess 520), process 500 may proceed to subprocess 530. Otherwise, when determining that no task that involves the movement of any carts 300 is to be performed (i.e., "No" in subprocess 520), process 500 may return to subprocess 510 to await either shutdown or a new task.

Subprocess 530 may identify the starting location of each cart 300 implicated by the task. In particular, controller 200 may identify each entity that needs to be moved to complete the task, and retrieve the current PTID associated with each entity (e.g., in secondary memory 220). From this PTID, controller 200 can identify the current location of each entity, which represents the starting location for movement of that entity. The entity may be a cart 300, segment 310, or item on a segment 310 of a cart 300. Regardless of the particular entity, the PTID will identify the cart 300 that needs to be moved to effect movement of the entity.

Subprocess 540 may identify the destination location of each cart 300. In the event that the task, determined in subprocess 520, is a scheduled task, controller 200 may retrieve the scheduled future PTID associated with each entity (e.g., in second memory 220). From this PTID, controller 200 can identify the future location of each entity, which represents the destination location for movement of that entity. In the event that the task is not a scheduled task, controller 200 may determine the destination location from the task. For example, the task may define the destination location for each entity. In general, the destination location will comprise a particular crossing square 110, such as an externally accessible crossing square 110 for a loading or unloading task.

Subprocess 550 may, for each cart 300 that needs to be moved between a starting location, determined in subprocess 530, and a destination location, determined in subprocess 540, determine the optimal movement path between that starting location and destination location. In the event that the task, determined in subprocess 520, requires the movement of a plurality of carts 300, the movements of the plurality of carts 300 may be considered collectively when determining the optimal movement path for each of the plurality of carts 300. In the event that a plurality of tasks are being performed in parallel, the movements of the plurality of carts 300, across all of the plurality of tasks, may be considered collectively when determining the optimal movement path for each of the plurality of carts 300 for each of the plurality of tasks. Optimality of the movement path may be determined according to one or more goals. Examples of goals include, without limitation, minimizing the overall number of movements required to complete the task(s) (e.g., where each movement is defined as moving a cart 300 from one crossing square 110 to an immediately adjacent crossing square 110), minimizing the overall amount of time required to complete the task, minimizing the movement of carts 300 that are not directly implicated by the task(s), maximizing the amount of time that certain crossing square(s) 110 remain open (e.g., remain unoccupied by any cart 300), ensuring that certain crossing square(s) 110 remain open, minimizing the number of turns, and/or the like. Subprocess 550 may be formulated as an optimization problem, in which an objective function, which outputs a quantification of one or more of the mentioned goals and/or other goals, based on inputs representing movements of carts 300, is optimized (e.g., maximized or minimized), potentially subject to one or more constraints (e.g., only certain crossing squares 110 can be occupied, certain crossing squares 110 must remain unoccupied, certain carts 300 cannot be moved or must be returned to their original locations if moved, etc.).

The optimal movement path(s), determined in subprocess 550, will ensure that two carts 300 do not collide with each other. In an embodiment, optimal movement paths may have an associated speed, such that some movements may be performed at a higher speed than other movements. A higher speed may be implemented by controller 200 rotating pinions 120 along one movement path faster than pinions 120 along another movement path. Controller 200 may utilize the variable speed of the movements to avoid collisions, prioritize one task or movement over another task or movement, and/or the like.

In an embodiment, during movements, controller 200 may detect collisions by sensing an increase in energy in the drive systems of pinions 110, and implement braking via pinions 120 in the event of a detected collision. In particular, controller 200 may independently control rotation of each of a first pair of pinions 120X1 and 120X2 and a second pair of pinions 120Y1 and 120Y2, of each crossing square 110, via a respective drive system (e.g., comprising an electric motor and axel 410). When controlling rotation of one of the pairs of pinions 120, controller 200 may automatically detect an increase in energy required by the respective drive system, and, in response to detecting the increase in energy, deactivate that pair of pinions 120, to thereby brake any cart 300 being moved by that pair of pinions 120. This mechanism ensures that carts 300 are not damaged during an unexpected collision, any humans walking on crossing squares 110 or other objects on crossing squares 110 are safe from carts 300, and the like.

In an embodiment, two or more carts 300 may be moved together as a one-dimensional or two-dimensional train. In particular, controller 200 may be configured to control one or both of a first pair of pinions 120X1 and 120X2 or a second pair of pinions 120Y1 and 120Y2, of each of at least a subset of the plurality of crossing squares 110, to assemble a plurality of carts 300 into a contiguous train, and move the contiguous train as a single unit within two-dimensional conveyor system 100.

Subprocess 560 may execute the movement path(s) determined in subprocess 550. In particular, controller 200 may control pinions 120 to move each cart 300, from its respective starting location, as identified in subprocess 530, to its respective destination location, as identified in subprocess 540, according to its respective movement path, as determined in subprocess 550. Any movements that can be performed in parallel, may be executed by controller 200 in parallel, to thereby reduce the time required to perform the task. In particular, if the task requires two or more carts 300 to be moved, those carts 300 may be moved in parallel, with the only limitation being that two carts 300 cannot occupy the same crossing square 110 at the same time.

In subprocess 570, two-dimensional conveyor system 100 may perform shutdown processing. The shutdown processing may comprise moving one or more of the plurality of carts 300 to respective initialization positions, and/or otherwise placing the components of two-dimensional conveyor system 100 into a suitable state for shutdown. For example, if controller 200 is in the process of performing a task, before shutting down two-dimensional conveyor system 100, controller 200 may complete the task and/or terminate the task in a manner that does not leave any components at risk of damage or contamination. The shutdown processing may also comprise storing any unsaved data in main memory 215 to secondary memory 220 before shutting down two-dimensional conveyor system 100, such that the data persist for future operations of two-dimensional conveyor system 100.

In summary, controller 200 may be configured to, for each of a plurality of tasks, for each of one or more of the plurality of carts 300 that need to be moved to complete the task, determine a starting location (i.e., a first one of the plurality of crossing squares 110) of the cart 300, determine a destination location of the cart (i.e., a second one of the plurality of crossing squares 110), determine an optimal movement path of the cart, between the starting location and the destination location, according to one or more goals (e.g., minimizing an overall number of movements, minimizing an overall time required to complete the task, etc.), and execute the determined optimal movement path by controlling pairs of pinions 120 along the determined optimal movement path.

7. Example Operation

Figure 6A:
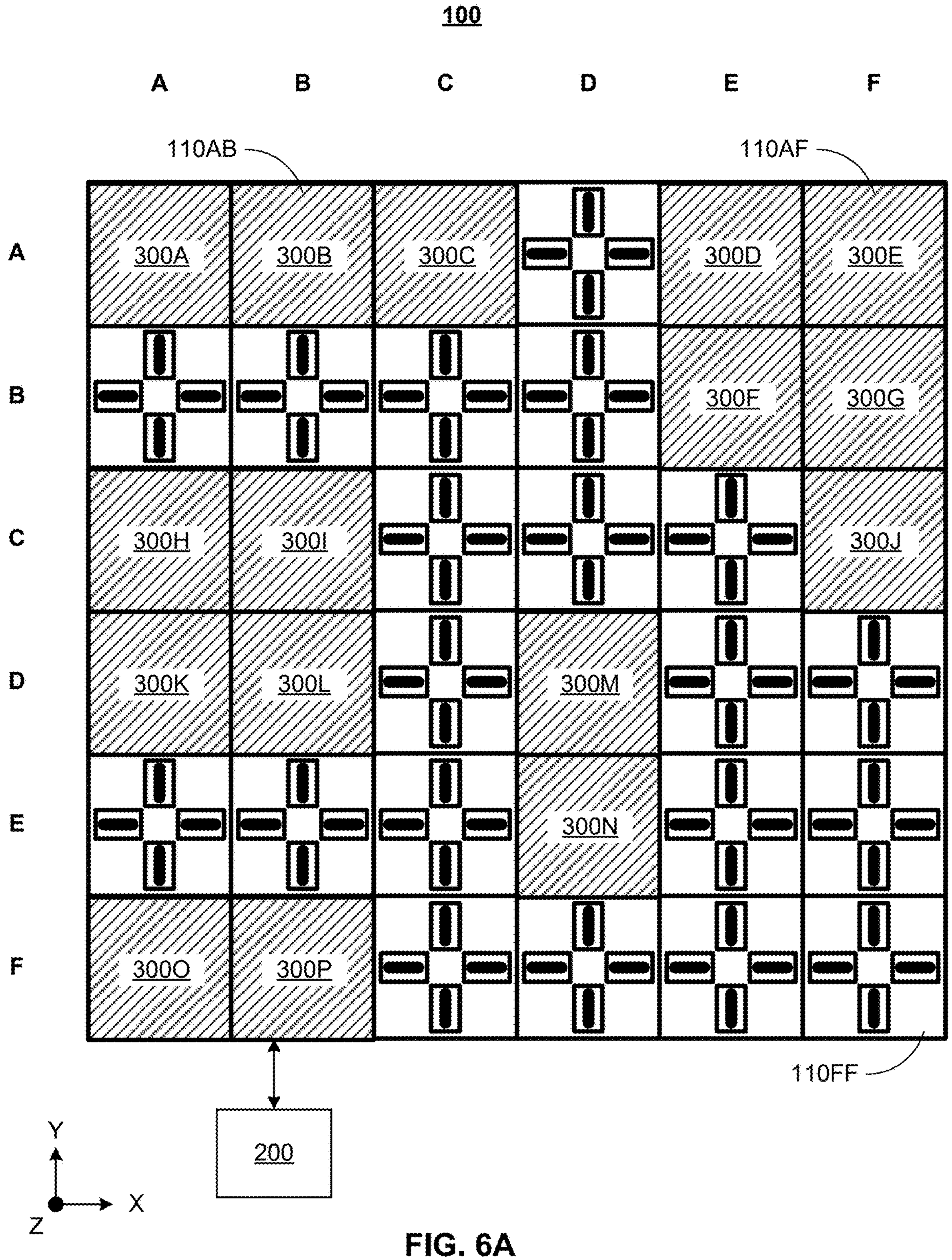
FIGS. 6A-6D illustrate example operations of a two-dimensional conveyor system, according to an embodiment.

To illustrate the operation of two-dimensional conveyor system 100, some example tasks will now be described. FIG. 6A illustrates the state of two-dimensional conveyor system 100 at the start of a task that will be described. In this example, there are sixteen carts 300A, 300B, 300C, 300D, 300E, 300F, 300G, 300H, 300I, 300J, 300K, 300L, 300M, 300N, 300O, and 300P. For the example tasks, it will be assumed that crossing square 110FF is an externally accessible crossing square 110 that represents both an ingress point for items and/or carts 300, as well as an egress point for items and/or carts 300.

In an exemplary first task, carts 300B and 300E are to be moved to crossing square 110FF for unloading of an item from each cart 300B and 300E, with the constraint that cart 300B must arrive before cart 300E. In this case, controller 200 determines the first task in subprocess 520, retrieves the PTID for cart 300B to identify the starting location of cart 300B as crossing square 110AB and retrieves the PTID for cart 300E to identify the starting location of cart 300E as crossing square 110AF, in subprocess 530, and determines the destination location for both carts 300B and 300E as crossing square 110FF in subprocess 540. Next, in subprocess 550, controller 200 determines the optimal movement paths from crossing square 110AB to crossing square 110FF and from crossing square 110AF to crossing square 110FF, subject to the constraint that cart 300B must arrive before cart 300E. Then, in subprocess 560, controller 200 controls pinions 120 to execute the determined movement paths.

Figure 6B:
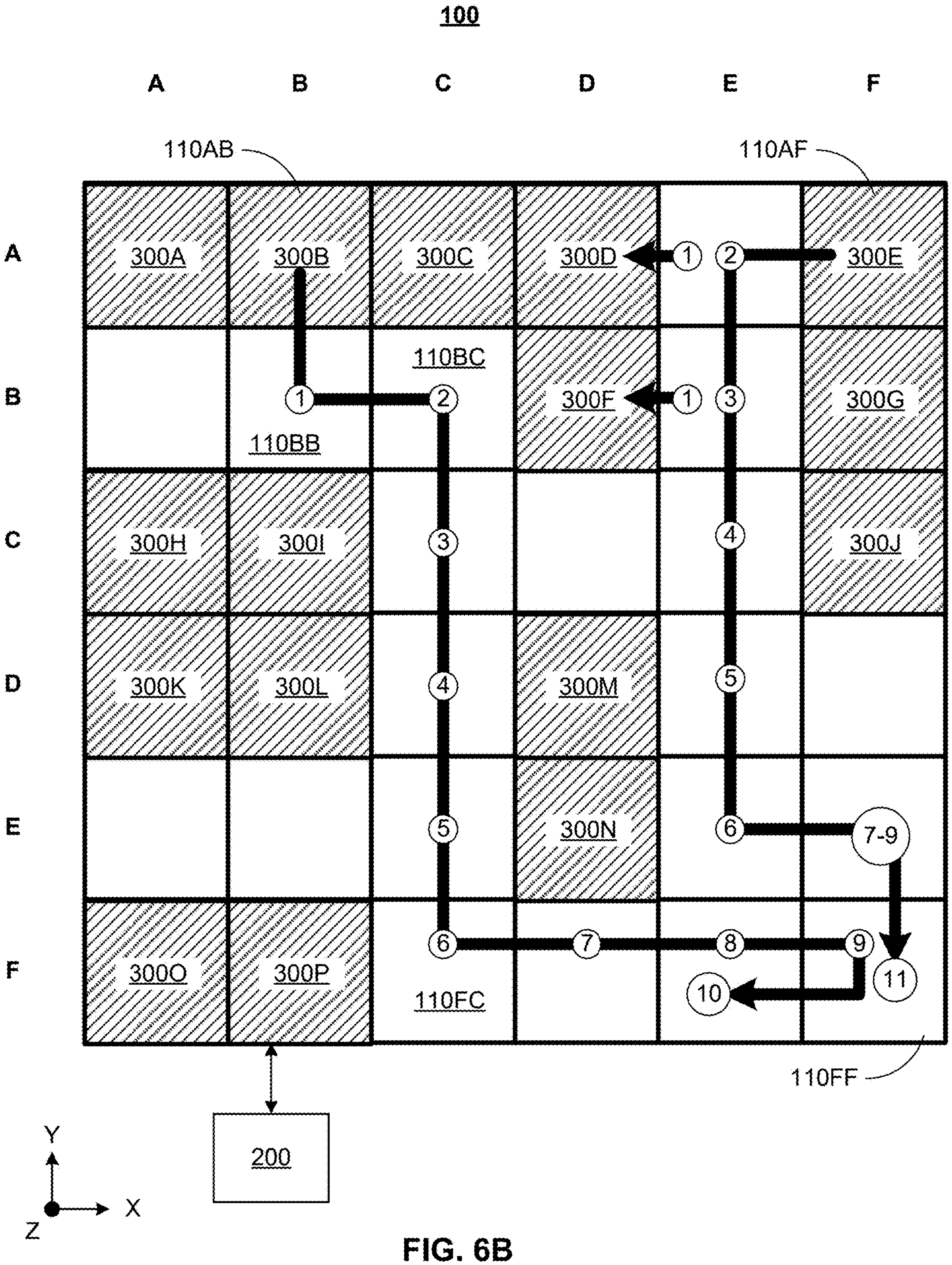

FIG. 6B illustrates the movement steps for each cart 300, during the first task, according to an example. For clarity, pinions 120 are not shown. In a first set of movement steps, cart 300B is moved in the negative Y-direction from location AB (i.e., in which crossing square 110AB exists) to location BB, and carts 300D and 300F are both moved in the negative-X direction from location AE to location AD and from location BE to location BD, respectively. Even though carts 300D and 300F are not implicated by the task, they are moved to open a path for cart 300E, which is implicated by the task. In movement steps 2-7, cart 300B is moved to locations BC, CC, DC, EC, FC, and FD, in that sequence, and cart 300E is moved to locations AE, BE, CE, DE, EE, and EF, in that sequence. Since cart 300B must arrive at crossing square 110FF before cart 300E, in movement steps 8 and 9, cart 300E remains stationary at location EF, while cart 300B is moved to locations FE and FF, in that sequence. At this point, cart 300B is externally accessible, and the item(s) that are to be removed from cart 300B may be removed from the respective segment(s) 310 of cart 300B. Next, in movement step 10, cart 300B is moved from location FF to location FE, to open crossing square 110FF. Finally, in movement step 11, cart 300E is moved from location EF to location FF. At this point, cart 300E is externally accessible, and the item(s) that are to be removed from cart 300E may be removed from the respective segment(s) 310 of cart 300E. This completes the first task. However, in some implementations, carts 300B and 300E may be returned to their original starting locations or may be stowed at other locations, for example, to keep crossing square 110FF open and paths clear for other tasks.

Each movement step of a cart 300 is implemented by activation of respective pinions 120. For example, to move cart 300B from crossing square 110AB to 110BB to 110BC, controller 200 may activate pinions 120Y1 and 120Y2 of crossing square 110AB, in the negative Y-direction, to engage with racks 320Y1 and 320Y2, respectively, on the bottom surface of cart 300B, which drives cart 300B in the negative Y-direction towards crossing square 1101BB, and activate pinion 120Y2 of crossing square 1101BB, in the negative Y-direction, to engage rack 320Y1 as it passes from crossing square 110AB to crossing square 110BB. Once rack 320Y1 engages with pinion 120Y2 of crossing square 110BB, controller 200 may activate pinion 120Y1 of crossing square 110BB, in the negative Y-direction, while deactivating pinion 120Y2 of crossing square 110AB. Cart 300B will continue to move in the negative Y-direction as pinion 120Y1 of crossing square 110BB engages with rack 320Y1 of cart 300B, and pinion 120Y2 of crossing square 110BB engages with rack 320Y2 of cart 300B, at which point controller 200 may deactivate pinion 120Y1 of crossing square 110AB.

Once cart 300B is centered within crossing square 1101BB, to move cart 300B from crossing square 110BB to 110BC, controller 200 may activate pinions 120X1 and 120X2 of crossing square 110BB, in the positive X-direction, to engage with racks 320X1 and 320X2 on the bottom surface of cart 300B, which drives cart 300B in the positive X-direction towards crossing square 110BC, and activate pinion 120X1 of crossing square 110BC, in the positive X-direction, to engage rack 320X2 as it passes from crossing square 110BB to crossing square 110BC. Once rack 320X2 engages with pinion 120X1 of crossing square 110BC, controller 200 may activate pinion 120X2 of crossing square 110BC, in the positive X-direction, while deactivating pinion 120X1 of crossing square 110BB. Cart 300B will continue to move in the positive X-direction as pinion 120X2 of crossing square 110BC engages with rack 320X2 of cart 300B, and pinion 120X1 of crossing square 110BC engages with rack 320X1 of cart 300B, at which point controller 200 may deactivate pinion 120X2 of crossing square 1101BB.

Notably, in general, turns may be minimized when determining the optimal movement paths, since each turn requires the coordination of pinions 120 along the X-axis with pinions 120 along the Y-axis. Thus, continuous movement in one direction enables more efficient activation of pinions 120. In particular, in the third, fourth, fifth, and sixth movement steps for cart 300B, during the first task, the pinions 120X1 and 120X2 for each of the crossing squares 110 along the straight path from crossing square 110BC to crossing square 110FC may be activated at the same time, to form a straight activated path that quickly drives cart 300B from crossing square 110BC to crossing square 110FC.

Figure 6C:
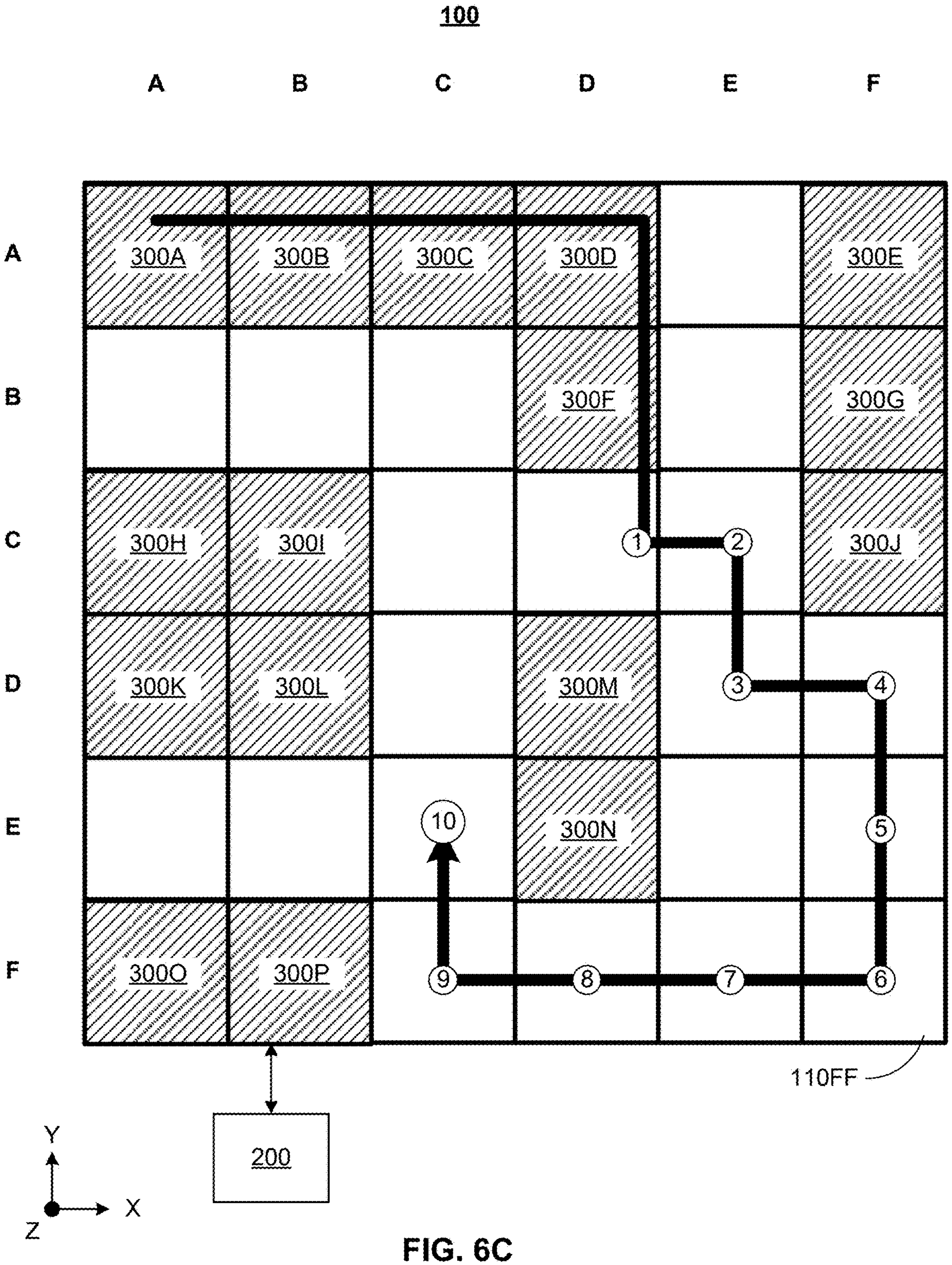
Figure 6D:
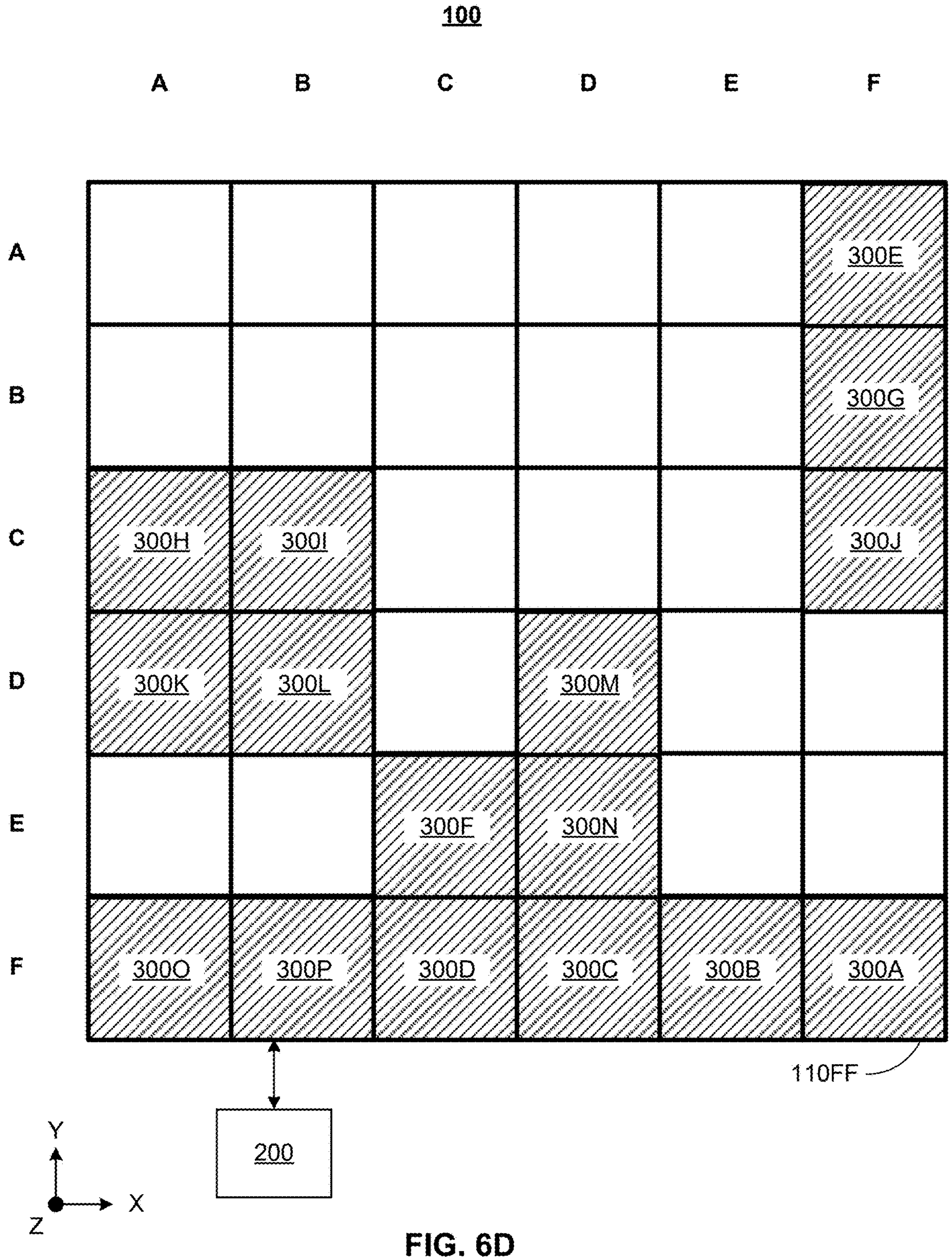

FIG. 6C illustrates the movement of a "train" of carts 300A, 300B, 300C, 300D, and 300F, according to an example. In this second task, this train of carts 300, all need to be moved to externally accessible crossing square 110FF, with no constraints on their respective arrivals at crossing square 110FF. For instance, each of carts 300A, 300B, 300C, 300D, and 300F in the train may need to be loaded with the same items. The entire train may be moved as a single unit that snakes through the open crossing squares 110 of two-dimensional conveyor system 100. In this case, cart 300F represents the front of the train, and cart 300A represents the rear of the train. FIG. 6D illustrates the final location of each cart 300 in the train, upon completion of the second task. Again, in some implementations, all carts 300 in the train may be returned to their original starting locations or may be stowed at other locations, for example, to keep crossing square 110FF open for other tasks. One advantage of moving carts 300 in a train is the more efficient operation of pinions 120, which may remain continuously activated until the rear cart 300 (e.g., 300A in the illustrated example) in the train has passed.

8. Example Embodiment

Disclosed embodiments comprise a two-dimensional conveyor system 100 comprising a plurality of crossing squares 110, arranged in both an X-dimension and a Y-dimension to form a plurality of rows and columns in a grid-like pattern. Each crossing square 110 may be sized to hold exactly one cart 300, and comprise a pair of pinions 120X1 and 120X2, along the X-axis, that crosses a pair of pinions 120Y1 and 120Y2, along the Y-axis, at a right angle. Across pairs of adjacent crossing squares 110 in the X-dimension, the pinions 120X1 and 120X2 in the first crossing square 110 are aligned with the pinions 120X1 and 120X2 in the second crossing square 110, along the X axis. Similarly, across pairs of adjacent crossing squares 110 in the Y-dimension, the pinions 120Y1 and 120Y2 in the first crossing square 110 are aligned with the pinions 120Y1 and 120Y2 in the second crossing square 110, along the Y-axis. Thus, pinions 120X1 and 120X2, in each row of crossing squares 110, are aligned to form a straight movement path across the entire row, and pinions 120Y1 and 120Y, in each column of crossing squares 110, are aligned to form a straight movement path across the entire column.

Carts 300 comprise corresponding racks 320 on their bottom surfaces, which engage with pinions 120 on crossing squares 110. In particular, when a cart 300 is precisely above and centered on a crossing square 110, racks 320X1 and 320X2 of each cart 300 engage with pinions 120X1 and 120X2 of that crossing square 110, and racks 320Y1 and 320Y2 of each cart 300, which cross racks 320X1 and 320X2 at a right angle, engage with pinions 120Y1 and 120Y2 of that crossing square 110.

When a pinion 120 engages with a rack 320 of a cart 300 and moves in a particular rotational direction, cart 300 also moves, along a tangential path, in the same direction. The pinions 120 of each crossing square 110 are controlled by controller 200, which allows for extremely precise movement of carts 300 along both the X-axis and the Y-axis of each and every crossing square 110. For example, controller 200 may activate pinions 120X1 and 120X2 to rotate in the same direction along the X-axis to move cart 300 in that X-direction, or active pinions 120Y1 and 120Y to rotate in the same direction along the Y-axis to move cart 300 in that Y-direction. In this manner, controller 200 may move cart 300 off of the center of each crossing square 110 in any of four linear directions. By moving cart 300 in a linear path, pinions 120 of one crossing square 110, engaged with racks 320 of a cart 300, will pass the cart 300 to aligned pinions 120 of an adjacent crossing square 110 in the direction of motion, to thereby move cart 300 to the adjacent crossing square 110.

During movement of a cart 300, there will always be at least two active pinions 120 engaged with corresponding racks 320 of the cart 300. For example, when cart 300 is in the center of a crossing square 110, all four racks 320 will be engaged with all four pinions 120. To move a cart 300 in a given direction, the pair of pinions 120 along that axis (i.e., pinions 120X1 and 120X2 for the X-axis, and pinions 120Y1 and 120Y2 for the Y-axis) will become active to rotate in the given direction. As cart 300 moves across the boundary of the originating crossing square 110 into an adjacent crossing square 110, the pinion 120 of the adjacent crossing square, at the leading edge of cart 300, will engage with the rack 320 at the leading edge of cart 300. At this point, there will be three pinions 120 simultaneously engaged with cart 300, along the direction of movement. Once cart 300 is approximately halfway off the originating crossing square 110, the pinion 120 at the trailing end of cart 300 will disengage with the corresponding rack 320 at the trailing end of cart 300. At this point, there will be at least two pinions 120 simultaneously engaged with cart 300, one pinion 120 on the originating crossing square 110 and the adjacent pinion 120 on the adjacent crossing square 110. As cart 300 continues to move past the halfway point, the rack 320 on the leading edge of cart 300 will engage with the other pinion 120 of the adjacent crossing square 110, along the direction of movement. At this point, there will again be three pinions 120 simultaneously engaged with cart 300, along the direction of movement. Eventually, the trailing edge of cart 300 will move off of the origination crossing square 110, and cart 300 will be centered over the adjacent crossing square 110. At this point, racks 320 are engaged with corresponding pinions 120 on the adjacent crossing square 110, and no longer engaged with any pinion 120 on the originating crossing square 110. Consequently, this movement step is complete, and cart 300 has been successfully moved from the originating crossing square 110 to the adjacent crossing square 110. It should be understood that this may be the final destination of cart 300, or cart 300 may continue to be moved in the same direction or may be moved (i.e., turned) in a different direction.

In an embodiment, controller 200 is configured to independently and precisely control each pinion 120 or each aligned pair of pinions 120X1/120X2 or 120Y1/120Y2. Controller 200 may execute time-sharing software that is capable of simultaneously moving a plurality of carts 300, in varying directions, within two-dimensional conveyor system 100, while preventing collisions between carts 300. Notably, all carts 300 are associated with real-time PTIDs, such that the precise location of each cart 300 is always known. In embodiments that comprise at least one reading station, these locations may be confirmed using reading station(s).

Multiple carts 300 can be moved independently across two-dimensional conveyor system 100. In addition, a plurality of carts 300, which are not physically connected in any manner, can be logically assembled into a train and moved as a train of carts 300. In particular, a plurality of carts 300 may be moved to form a contiguous train of adjacent carts 300, with at least a first cart 300 and at least a last cart 300, and potentially one or more carts 300 therebetween. Once assembled, this train may be moved as a unit. For instance, the train may be moved in the same manner as a train, with the first cart 300 moving into a new crossing square 110, the second cart 300 in the sequence moving into the crossing square 110 vacated by the first cart 300, the third cart 300 in the sequence moving into the crossing square 110 vacated by the second cart 300, and so on and so forth, until the last cart 300 moves into the crossing square 110 vacated by the penultimate cart 300. However, unlike a real train, the train of carts 300 may also be moved sideways, with each cart 300 moving in a direction that is orthogonal to the axis along which the first and last carts 300 are oriented with respect to each other. It should be understood that a train does not necessarily need to be a chain of carts 300, but could comprise any contiguous array of carts 300, including two-dimensional arrays of carts 300. A train could also comprise a plurality of non-contiguous carts 300. The term "train" is simply used to refer to any collection of carts 300 that are moved by controller 200 as a single unit. A train 300 may be used to assemble carts 300, holding the same or related items, into a single unit. Just as easily as a train 300 can be assembled, the train can also be disassembled as needed, simply by dissociating one or more carts 300 from the train, such that those carts 300 are no longer moved in tandem with other carts 300 in the train.

At a high level, controller 200 will complete tasks that require the movement of at least one cart 300 from a starting crossing square 110 to a destination crossing square 110. A common destination crossing square 110 may be one that is externally accessible from an external environment of two-dimensional conveyor system 100. Carts 300 may be moved to this externally accessible crossing square 110 for unloading and loading of items, and may be moved from this externally accessible crossing square 110 to an internal crossing square 110 for storage of items within two-dimensional conveyor system 100. It should be understood that items may be loaded onto carts 300 in two-dimensional conveyor system 100 from external systems, and may be unloaded from carts 300 in two-dimensional conveyor system 100 to external systems, via externally accessible crossing square 110. The external environment may include, without limitation, a loading and/or unloading site, a packaging site, another two-dimensional conveyor systems 100, another storage system, a storeroom, an electronic kiosk, a store (e.g., retail store, grocery store, etc.), a truck or trailer, and the like.

When moving a cart 300 or train of carts 300, controller 200 determines an optimal movement path (e.g., in subprocess 550) between the starting crossing square 110 and the destination crossing square 110. In some cases, an open path may already exist between these two crossing squares 110. An "open path" is any contiguous sequence of open crossing squares 110 (i.e., crossing squares 110 that are not occupied by any cart 300) that forms a path between the starting crossing square 110 and the destination crossing square 110. If no open path does not exist or if all open paths are sub-optimal (e.g., the open path is much longer than the shortest possible), controller 200 may create an open path by emptying or "opening" one or more crossing squares 110. Controller 200 may open a crossing square 110 by moving a cart 300 that is currently occupying that crossing square 110 to another crossing square 110 that is not in the path. In summary, the optimal movement path for cart(s) 300 may include one or more occupied crossing squares 110, and executing the optimal movement path may comprise clearing the occupied crossing square(s) 110 by moving each cart 300 that is on one of the occupied crossing square(s) 110 to a crossing square 110 that is not on the optimal movement path.

In the event that controller 200 is moving a plurality of carts 300 simultaneously, a first cart 300 that is being moved for a first task may cross the path of a second cart 300 that is being moved for a second task. In this case, controller 200 may synchronize the movements for the two tasks so that the first cart 300 crosses the path of the second cart 300, at a crossing square 110, either at least one movement step before the second cart 300 reaches that crossing square 110 or at least one movement step after the second cart 300 reaches that crossing square 110. In other words, controller 200 may determine the movement paths for a plurality of simultaneous tasks, such that the movements for different tasks do not block each other. Thus, the optimization of movements may be performed in consideration of all the different tasks that are being performed simultaneously.

The ability of controller 200 to dynamically clear paths enables much denser storage (i.e., a higher percentage of crossing squares 110 occupied by carts 300). Conceptually, this can be thought of as controller 200 moving the openings within two-dimensional conveyor system 100. Technically, only one opening (i.e., one open crossing square 110) is required. Even a cart 300 in the middle of a densely packed collection of carts 300 can be moved to any crossing square 110 by continually moving the opening in front of that cart 300. However, this may result in very slow access to carts 300, since a lot of movements will be required to open paths through the densely packed carts 300. Thus, in practice, two-dimensional conveyor system 100 may comprise a significant percentage of openings. It should be understood that there will be a tradeoff between the amount of storage (i.e., the number of carts 300) and the speed of access (i.e., the amount of time required for random access of a cart 300).

In some implementations, the speed of access may not be much of a concern. In these cases, a larger percentage of crossing squares 110 may be occupied by carts 300. For instance, two-dimensional conveyor system 100 may be housed on the floor of the storage hold of a delivery truck. As a very specific, non-limiting example, the two-dimensional conveyor system 100 may have a four-by-five grid of twenty crossing squares 110, with only one opening (i.e., nineteen carts 300). Carts 300 may have varying numbers of segments 310. For instance, some carts 300 may have a ten-by-ten grid of segments 310 (i.e., one-hundred segments 310) for small items, while other carts 300 may have just a single segment 310 for large items. There may be three or four two-dimensional conveyor systems 100, stacked like shelves along the Z-axis of the storage hold, under the control of the same controller 200 or separate controllers 200. Each two-dimensional conveyor system 100 may have at least one externally accessible crossing square 110 that is accessible via an access door of the storage hold of the delivery truck. For stacked two-dimensional conveyor systems 100, the at least one externally accessible crossing square 110 of each two-dimensional conveyor system 100 may be aligned along the same Z-axis, such that the externally accessible crossing square 110 of every two-dimensional conveyor system 100 in the storage hold is accessible from the same location.

In the delivery-truck example, controller 200 may store the order of each delivery stop and each item that is to be delivered at each delivery stop. Based on the PTIDs of the items, controller 200 may determine the optimal sequence of movements to place each item for each delivery stop at the externally accessible crossing square 110 (e.g., at the access door of the storage hold) during travel to the delivery stop. For example, during travel of the delivery truck from its home base to the first delivery stop, controller 200 may move cart(s) 300 containing the item(s) for the first delivery stop to the externally accessible crossing square 110 by the time that the delivery truck arrives at the first delivery stop. The delivery driver may unload the item(s) from cart(s) 300 occupying the externally accessible crossing square 110, and deliver those item(s) to the destination. Then, as the delivery truck travels from the first delivery stop to the second delivery stop, controller 200 may move cart(s) 300 containing the item(s) for the second delivery stop to the externally accessible crossing square 110 by the time that the delivery truck arrives at the second delivery stop. Again, the delivery driver may unload the item(s) from cart(s) 300 occupying the externally accessible crossing square 110, and deliver those item(s) to the destination. This may continue for the entire route of the delivery truck, for efficient delivery of all items.

In contrast, in other implementations, the speed of access may be a significant concern. For example, in a warehouse of inventory for an online marketplace, orders may need to be fulfilled as quickly as possible. In this case, two-dimensional conveyor system 100 may be deployed on the floor of the warehouse, and comprise a significant percentage of open crossing squares 110. The externally accessible crossing square(s) 110 may reside at packing sites, where human or robotic workers can unload items from carts 300 and pack them into shipping containers.

In an embodiment, carts 300 may be stowed in rows, with at least one row kept open. In this case, any row may be opened by sliding all occupied rows, between the open row and the row to be opened, along the Y-axis, into the open row. The movement of the open row in this manner (i.e., by sliding the occupied rows) can quickly open a path, along the X-axis, for any cart 300 in any row. A column could also be kept open to provide a constant open path along the Y-axis. If the column includes an externally accessible crossing square 110, there will always be an easy path for any cart 300 to the externally accessible crossing square 110. It should be understood that, in an alternative embodiment, the role of the rows and columns may be reversed, such that carts 300 are stowed in columns, instead of rows, with at least one column and one row always kept open.

Advantageously, each cart 300 performs the same function as a robotic drive unit, but without requiring any on-board computer, on-board navigation, on-board battery, or on-board sensor system. Thus, carts 300 may be easily manufactured and require minimal mechanical maintenance, which makes them inexpensive and reliable. This does not mean that a cart 300 may not have an on-board computer, navigation, battery, or sensor system. However, such components are not necessary, and at the very least, can be significantly less complex and expensive than the analogous components required for a fully autonomous drive unit. In an embodiment, each of the plurality of carts 300 does not comprise any sensors, computer processors, and computer software.

Since carts 300 do not require batteries to be moved, the complexity of controller 200 can also be reduced. In particular, controller 200 does not have to account for the state of charge of each cart 300, for example, by continually receiving communications of the state of charge from each cart 300. Nor does controller 200 have to schedule recharging of carts 300 based on their states of charge. This significantly reduces the amount of computational resources (e.g., processing power, memory, network communications, etc.) required by controller 200, as well as the computational complexity of the optimization of movement paths.

In contrast to conventional systems that utilize robotic drive units, two-dimensional conveyor system 100 centralizes the intelligence in controller 200, and powers carts 300 via pinions 120 within a two-dimensional grid of crossing squares 110. Crossing squares 110 are relatively simple mechanical structures, that, in some embodiments, comprise only four motorized pinions 120. Like carts 300, crossing squares 110 do not require any intelligence (i.e., computer hardware and software), and therefore, are relatively inexpensive to manufacture, as well as reliable. If a crossing square 110 fails, it can be simply and easily replaced by removing the failed crossing square 110 and dropping in a new crossing square 110 in its place, in a modular manner. In an embodiment, failed crossing squares 110 may be left in place at least temporarily, and controller 200 may be configured to detect, record, and bypass each failed crossing square 110. Maintenance may be scheduled to replace each failed crossing square 110, at periodic intervals, once a certain number or percentage of crossing squares 110 have failed, when performance of two-dimensional conveyor system 100 has degraded by a predefined amount or percentage, and/or the like. Advantageously, all of the complexity and expense of computer hardware and software can be confined to controller 200, which may perform all navigation, sensing, and control. A single common controller 200 may serve the entire two-dimensional conveyor system 100, which simplifies the maintenance of the hardware and software.

Notably, the storage capacity of two-dimensional conveyor system 100 can be extended in the Z-dimension. As one option, a plurality of two-dimensional conveyor systems 100 can be stacked along the Z-axis, for example, on a plurality of shelves, with sufficient space therebetween to accommodate carts 300. As another option, each cart 300 may comprise a plurality of levels, stacked along the Z-axis, for example, as a plurality of shelves that each comprises one or more segments 310. These two options are not mutually exclusive. For example, a plurality of two-dimensional conveyor systems 100 can be stacked along the Z-axis, with sufficient space therebetween to accommodate carts 300 with a plurality of levels, stacked along the Z-axis. Thus, two-dimensional conveyor system 100 allows for extensibility in all three dimensions, X, Y, and Z.

In an embodiment in which two-dimensional conveyor system 100 comprises a plurality of levels, stacked along the Z-axis, two-dimensional conveyor system 100 may comprise a lift that can move carts 300 between each of the plurality of levels. For example, each of the plurality of levels may share at least one crossing square 110 that is capable of being lifted up and down, along the Z-axis, through the plurality of levels, under the control of controller 200, to thereby act as a lift. Alternatively, the lift may be distinct from any crossing square 110, but may be accessible to at least one crossing square 110 in each of the plurality of levels. In either case, the lift may move up and down, along the Z-axis, as an elevator, and may have the same or similar size as crossing squares 110. When stopped at each of the plurality of levels, the lift may be aligned, along the X-axis and/or Y-axis, as well as the Z-axis, with at least one crossing square 110 on that level, such that a cart 300 can be moved on and off the lift in the same manner as carts 300 are moved between crossing squares 110.

There is no limit to the scale of two-dimensional conveyor system 100. For example, as discussed above, two-dimensional conveyor system 100 may be expanded in any dimension, X, Y, or Z. In addition, crossing squares 110 and carts 300 can be scaled to any size, from tiny crossing squares 110 that move tiny carts 300, to huge crossing squares 110 that move huge carts 300 (e.g., the size of railroad cars) carrying heavy cargo, and anywhere in between, such as a the scale of laboratory equipment, storage rooms, kitchen pantries, refrigerators or freezers, delivery trucks, a warehouse, and the like.

As discussed elsewhere herein, at least one crossing square 110, within each two-dimensional conveyor system 100, may be accessible from an external environment. It should be understood that there may be a plurality of externally accessible crossing squares 110. For example, every crossing square 110 (e.g., an entire row or column) on the edge of at least one side of two-dimensional conveyor system 100 may be externally accessible. As examples, all crossing squares 110 on the corners of two-dimensional conveyor system 100 may be externally accessible, all crossing squares 110 on the edge (e.g., entire row or column) of only a single side of two-dimensional conveyor system 100 may be externally accessible, all crossing squares 110 on the edge of each of only two opposing sides of two-dimensional conveyor system 100 may be externally accessible, all crossing squares 110 on the edge of each of only two orthogonal sides of two-dimensional conveyor system 100 may be externally accessible, all crossing squares 110 on the edge of each of only three sides of two-dimensional conveyor system 100 may be externally accessible, all crossing squares 110 on the edge of each of all four sides of two-dimensional conveyor system 100 may be externally accessible, some subset of one or more crossing squares 110 on the edge of each of one or more sides of two-dimensional conveyor system 100 may be externally accessible, some subset of one or more crossing squares 110 in an interior of two-dimensional conveyor system 100 may be externally accessible (e.g., from above), and/or the like. In an embodiment of two-dimensional conveyor system 110 that comprises a plurality of levels, each of one or more, and potentially all, of the externally accessible crossing squares 110 may be a lift, along the Z-axis, as described above.

The external environment may comprise or consist of an open space that enables a human or robot to access any cart 300 at the externally accessible crossing square 110. Alternatively, this external environment may comprise or consist of an external system, such as another autonomous system that is able to move items from and/or to the cart 300 at the externally accessible crossing square 110. In some cases, the external system may be another conveyance system, such as another two-dimensional conveyor system 100, the total lab automation system described in U.S. Pat. No. 12,282,036, issued on Apr. 22, 2025, the coordinated conveyor system described in U.S. Pat. No. 11,498,764, issued on Nov. 15, 2022, and/or the coordinated conveyor system described in U.S. Pat. No. 11,754,576, issued on Sep. 12, 2023, which are all hereby incorporated by reference as if set forth in full.

As an example, the autonomous system that has access to externally accessible crossing square 110 could be a robotic picker and/or loader that is configured to grab items off of cart 300 or place items onto cart 300 from above. Each segment 310 and/or item may be associated with a PTID, and a robotic picker may retrieve the current PTID for the item to be picked, position a robotic arm directly above the location, identified by the PTID, control the robotic arm to grab the item at the location, and then move the robotic arm to drop the item at a location within the external system. Similarly, a robotic loader may retrieve the current PTID for segment 310 onto which to place an item, control the robotic arm to grab the item from a location within the external system, position the robotic arm above the identified segment 310, and then control the robotic arm to drop the item onto the identified segment 310. In either case, the robotic arm may comprise two or more robotic fingers, a suction device, and/or the like.

As another example, this autonomous system that has access to externally accessible crossing square 110 could be another type of tool. For example, the tool may analyze an item on a cart 300 that is located on the externally accessible crossing square 110. This analysis may comprise measuring some attribute of the item (e.g., size, composition, spectral characteristics, etc.), altering the item in some manner (e.g., performing a physical action on the item), combining the item with another item (e.g., combining a sample with a reagent), testing the item, imaging the item, reading the item (e.g., a machine-readable indicium on the item), and/or the like.

It should be understood that a two-dimensional conveyor system 100 may comprise a plurality of externally accessible crossing squares 110. In this case, each of the plurality of externally accessible crossing squares 110 may be accessible to the same external environment or different external environments, including potentially to the same or different external spaces (e.g., to be accessed by the same or different human or robot), the same or different external systems, and/or the like.

Controller 200 may employ software to optimize movement within two-dimensional conveyor system 100. This will avoid most collisions. However, as an added measure, controller 200 may be configured to sense contact between carts 300 in order to avoid hard collisions between carts 300. In particular, when activating pinions 120, pinions 120 may be activated at a slow rate of rotation first. This pushes a cart 300, whose racks 320 are engaged with the pinions 120, at a slow rate of speed. If the adjacent crossing square 110, to which the cart 300 is being pushed, is occupied, the occupying cart 300 will provide resistance to the cart 300 being moved. In turn, this will provide resistance to the pushing pinions 110, which will be reflected in an increase in energy used by the motor driving axel 410 of pinions 120. Controller 200 may be configured to detect this increase in energy, and in response to the detected increase in energy, perform a remedial action. The remedial action may comprise updating one or more PTIDs to reflect that the adjacent crossing square 110 is occupied, moving the occupying cart 300, determining a new path for movement of the cart 300 being moved, notifying an operator, and/or the like.

Effectively, this sensing ability of controller 200 turns carts 300 into sensitive bumper cars, without the need of adding sensors or other hardware to carts 300. Everything necessary for the sensing is already present by virtue of the drive system (e.g., motor and axels 410) of pinions 120 and connected controller 200.

This sensing ability may be used to generate an occupation map of crossing squares 110 within two-dimensional conveyor system 100. The occupation map may indicate the state (i.e., open or closed) of each of the plurality of crossing squares 110. For example, during initialization of two-dimensional conveyor system 100 or in the event of the loss or corruption of data (e.g., PTIDs), controller 200 may implement a procedure that activates pinions 120, simultaneously, altogether or in groups, or individually, and uses the detection of increases in energy to automatically determine which crossing squares 110 are occupied by carts 300 and which crossing squares 110 are open. In particular, controller 200 may be configured to generate an occupation map of the plurality of crossing squares by activating at least a subset of the pairs of pinions 120 of each of the plurality of crossing squares 110 to detect increases in energy required by the respective drive systems, and identifying a state of each crossing square 110 based on the increases in energy. In this case, the state is one of occupied by one of the plurality of carts 300 or unoccupied by any of the plurality of carts 300.

In an embodiment, pinions 110 may also act as brakes, capable of immediately stopping any cart 300 or train of carts 300 as soon as an occupied crossing square 110 is detected via the sensing of an increase in energy in the drive system. For example, if a human steps onto a crossing square 110, the cart 300 or the front of a train of carts 300 may make contact with the human. In this case, controller 300 will sense the increase in energy in the drive system, and may immediately deactivate all pinions 120 that are driving the cart(s) 300, to prevent injury to the human or other occupant of the crossing square 110. Notably, when pinions 120 are deactivated, the back of stationary teeth 125 of pinions 120 will engage with the front of teeth 325 of racks 320, to thereby stop the motion of cart 300. In this manner, pinions 120 act as safety brakes, without carts 300 having to actually comprise brakes, thereby simplifying the manufacture of carts 300, while maintaining human safety. As discussed elsewhere herein, carts 300 may comprise bumpers that dampen the force of contact with other carts 300, humans, or other objects, even when inertia carries a cart 300 slightly forward before being braked by pinions 120.

In an embodiment, controller 200 may be configured to drive pinions 120, and therefore, carts 300, at varying speeds. In this case, controller 200 may, in addition to determining optimal movement paths, determine the optimal speed to move carts 300 along those movement paths. The speed of a cart 300 is defined by the rotational speed of the pinions 120 that are driving that cart 300, which is defined by the rotations per minute (RPM) of the respective axel 410, which is defined by the power to the motor that is driving axel 410. It should be understood that the speed for one task or movement step may be different for another task or movement step. Thus, at any given time, carts 300 may be moving, within two-dimensional conveyor system 100, at different speeds from each other. For instance, if simultaneously moving carts 300 would collide if moving at the same speed along their respective movement paths, controller 200 may speed up the movement along one movement path and/or slow down the movement along the other movement path to avoid the collision. In an embodiment in which humans may be present on crossing squares 110, controller 200 may ensure that all carts 300 are moving a safe speed, so as not to impose any risk to the humans.

In an embodiment, controller 200 records all movement steps and/or movement paths of carts 300 in two-dimensional conveyor system 100 in a movement table. This movement table represents the measure of work or service provided by two-dimensional conveyor system 100. This measure of work (e.g., number of movement steps, number of movement paths, etc.) may be used in a licensing scheme for movement as a service (MaaS). For example, a user of two-dimensional conveyor system 100 may be billed by the licensor based on the measure of work.

In an embodiment, controller 200 may periodically re-sort carts 300 within two-dimensional conveyor system 100. For example, during a downtime, when no tasks are being performed, and/or at scheduled intervals, controller 200 may perform a re-sorting procedure in the background as a background operation. In particular, controller 200 may execute an optimization algorithm to determine the optimal placement of each cart 300, for instance, based on historical access of carts 300 or items on carts 300, scheduled access of carts 300 or items on carts 300, historical tasks performed in two-dimensional conveyor system 100, scheduled tasks to be performed in two-dimensional conveyor system 100, and/or the like. Then, controller 200 may move at least a subset of carts 300, according to the optimal placement, determined by the execution algorithm, to thereby optimize the location of each cart 300 for future tasks.

It is generally contemplated that two-dimensional conveyor system 100 comprises a grid of contiguous rows and columns. However, in an alternative embodiment, two or more rows and/or columns may be separated by a distance. For instance, two-dimensional conveyor system 100 could comprise a long one-dimensional series of crossing squares 110, along either the X-axis or the Y-axis. For example, a long one-dimensional column of crossing squares 110, along the Y-axis, may move a cart 300 from one row of crossing squares 110 to another row of crossing squares 110 that are separated by a long distance. Alternatively or additionally, a long one-dimensional series of crossing squares 110, along either the X-axis or the Y-axis, may be employed to move carts 300 between a first site (e.g., an externally accessible crossing square 110 of a first two-dimensional conveyor system 100, or other system) and a second site (e.g., an externally accessible crossing square of a second two-dimensional conveyor system 100, or other system). A system could employ a plurality of these one-dimensional series of crossing squares 110, and one-dimensional series of crossing squares 110 that are oriented along the X-axis may cross one-dimensional series of crossing squares 110 that are oriented along the Y-axis at right angles. These one-dimensional series of crossing squares 110 may move carts 300 unidirectionally (i.e., always in a single direction along the respective axis) or bidirectionally (i.e., in either direction along the respective axis). Notably, pinions 120 of the crossing squares 110, in a one-dimensional series of crossing squares 110 that is at least temporarily unidirectional, may move a cart 300 at a relatively faster speed, since there is no risk of a cart 300 moving orthogonally to the direction of the moving cart 300, except at intersections, if any.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A two-dimensional conveyor system comprising:

a plurality of crossing squares arranged in both an X-dimension and a Y-dimension to form a plurality of rows and columns, wherein each of the plurality of crossing squares comprises a first pair of pinions, aligned along the X-dimension, and a second pair of pinions, aligned along the Y-dimension;

a plurality of carts occupying a subset of the plurality of crossing squares, wherein a number of the plurality of carts is at least one less than a number of the plurality of crossing squares, and wherein each of the plurality of carts comprise a first pair of racks, aligned along the X-dimension and configured to engage with the first pair of pinions of each of the plurality of crossing squares, and a second pair of racks, aligned along the Y-dimension and configured to engage with the second pair of pinions of each of the plurality of crossing squares; and a controller that is configured to independently control rotation of the first pair of pinions and the second pair of pinions of each of the plurality of crossing squares, wherein the controller independently controls rotation of each of the first pair of pinions and the second pair of pinions via a respective drive system, and wherein the controller is further configured to, when controlling rotation of one of the first pair of pinions or second pair of pinions, automatically, detect an increase in energy required by the respective drive system, and in response to detecting the increase in energy, deactivate the one pair of pinions to thereby brake any cart being moved by the one pair of pinions.

2. The two-dimensional conveyor system of claim 1, wherein each of the plurality of carts comprises a top surface that is configured to hold one or more items.

3. The two-dimensional conveyor system of claim 2, wherein the top surface of each of the plurality of carts comprises one or more segments, wherein each of the one or more segments is configured to hold at least one of the one or more items, and wherein the one or more segments of the top surface of at least one of the plurality of carts is divided into a plurality of segments.

4. The two-dimensional conveyor system of claim 3, wherein each item is associated with a place-time identifier, and wherein the place-time identifier associated with each item comprises:

a component vector that identifies one of the plurality of carts on which the item is being held;

a surface vector that identifies one of the one or more segments on which the item is being held; and a time vector that identifies a time at which the item is at a location defined by the component vector and the surface vector.

5. The two-dimensional conveyor system of claim 4, wherein the controller is further configured to store the place-time identifier associated with each item for each of a plurality of points in time.

6. The two-dimensional conveyor system of claim 4, wherein each of the plurality of carts is associated with a place-time identifier, and wherein the place-time identifier associated with each cart comprises:

a component vector that identifies one of the plurality of crossing squares occupied by the cart; and a time vector that identifies a time at which the cart is at a location defined by the component vector.

7. The two-dimensional conveyor system of claim 6, wherein the controller is further configured to store the place-time identifier for each cart for each of a plurality of points in time.

8. The two-dimensional conveyor system of claim 1, wherein each of the plurality of carts is associated with a place-time identifier, and wherein the place-time identifier associated with each cart comprises:

a component vector that identifies one of the plurality of crossing squares occupied by the cart; and a time vector that identifies a time at which the cart is at a location defined by the component vector.

9. The two-dimensional conveyor system of claim 8, wherein the controller is further configured to store the place-time identifier for each cart for each of a plurality of points in time.

10. The two-dimensional conveyor system of claim 1, wherein the controller is further configured to, for each of a plurality of tasks, for each of one or more of the plurality of carts that need to be moved to complete the task:

determine a starting location of the cart, wherein the starting location is a first one of the plurality of crossing squares;

determine a destination location of the cart, wherein the destination location is a second one of the plurality of crossing squares;

determine an optimal movement path of the cart, between the starting location and the destination location, according to one or more goals; and execute the determined optimal movement path by controlling pairs of pinions along the determined optimal movement path.

11. The two-dimensional conveyor system of claim 10, wherein the one or more goals comprise minimizing an overall number of movements.

12. The two-dimensional conveyor system of claim 10, wherein the one or more goals comprise minimizing an overall time required to complete the task.

13. The two-dimensional conveyor system of claim 10, wherein the optimal movement path includes one or more occupied ones of the plurality of crossing squares, and wherein executing the optimal movement path comprises clearing the one or more occupied crossing squares by moving each of the plurality of carts that are on the one or more occupied crossing squares to one of the plurality of crossing squares that are not on the optimal movement path.

14. The two-dimensional conveyor system of claim 1, wherein each of the plurality of carts does not comprise any sensors, computer processors, and computer software.

15. The two-dimensional conveyor system of claim 1, wherein the controller is further configured to, in response to detecting the increase in energy, notify an operator.

16. The two-dimensional conveyor system of claim 1, wherein the controller independently controls rotation of each of the first pair of pinions and the second pair of pinions of each of the plurality of crossing squares via a respective drive system, and wherein the controller is further configured to generate an occupation map of the plurality of crossing squares by:

activating at least a subset of the first pair of pinions and the second pair of pinions of the plurality of crossing squares to detect increases in energy required by the respective drive systems; and identifying a state of each crossing square based on the increases in energy, wherein the state is one of occupied by one of the plurality of carts or unoccupied by any of the plurality of carts.

17. The two-dimensional conveyor system of claim 1, wherein the controller is further configured to control one or both of the first pair of pinions or the second pair of pinions of each of at least a subset of the plurality of crossing squares to:

assemble a plurality of carts into a contiguous train; and move the contiguous train as a single unit within the two-dimensional conveyor system.

18. The two-dimensional conveyor system of claim 1, wherein the controller is further configured to re-sort the plurality of carts as a background operation by:

executing an optimization algorithm to determine an optimal placement of each of the plurality of carts; and moving at least a subset of the plurality of carts, according to the optimal placement, to thereby optimize a location of each of the plurality of carts for future tasks.

19. The two-dimensional conveyor system of claim 18, wherein the optimization algorithm determines the optimal placement based on one or more of historical access of the plurality of carts, or scheduled access of the plurality of carts.

* * * * *